(12) United States Patent
Alcorn et al.

(10) Patent No.: US 11,920,964 B2
(45) Date of Patent: Mar. 5, 2024

(54) WATER METERING DEVICE AND METHODS FOR WATER CONSUMPTION APPORTIONMENT

(71) Applicant: SimpleSUB Water, Denver, CO (US)

(72) Inventors: Bradley W. Alcorn, Arvada, CO (US); Devin Callahan, Denver, CO (US); Mark Clark, Denver, CO (US)

(73) Assignee: SIMPLESUB WATER, Denver, CO (US)

( * ) Notice: Subject to any disclaimer, the term of this patent is extended or adjusted under 35 U.S.C. 154(b) by 238 days.

(21) Appl. No.: 17/335,913

(22) Filed: Jun. 1, 2021

(65) Prior Publication Data

US 2021/0372837 A1 Dec. 2, 2021

Related U.S. Application Data

(60) Provisional application No. 63/031,657, filed on May 29, 2020.

(51) Int. Cl.
*G01F 1/667* (2022.01)
*G01F 1/66* (2022.01)

(52) U.S. Cl.
CPC .............. *G01F 1/668* (2013.01); *G01F 1/662* (2013.01)

(58) Field of Classification Search
CPC ................................ G01F 1/668; G01F 1/662
USPC ...................................................... 73/861.28
See application file for complete search history.

(56) References Cited

U.S. PATENT DOCUMENTS

| 5,831,175 | A | * | 11/1998 | Fletcher-Haynes | ..... G01F 1/667 |
| | | | | | 73/1.16 |
| 5,856,622 | A | * | 1/1999 | Yamamoto | ........... G01N 29/326 |
| | | | | | 73/861.28 |
| 6,349,599 | B1 | * | 2/2002 | Lynnworth | .......... G01N 29/228 |
| | | | | | 73/644 |
| 9,874,466 | B2 | * | 1/2018 | Leaders | .................. G16Z 99/00 |
| 10,229,579 | B2 | | 3/2019 | Alcorn et al. | |
| 2003/0041674 | A1 | * | 3/2003 | Ohnishi | .................... G01F 1/66 |
| | | | | | 73/861.27 |
| 2016/0335875 | A1 | * | 11/2016 | Alcorn | ....................... G01F 1/34 |
| 2017/0160240 | A1 | * | 6/2017 | Fan | ......................... G01F 1/667 |
| 2018/0306617 | A1 | * | 10/2018 | Bonomi | .................. G01F 1/663 |

(Continued)

OTHER PUBLICATIONS

Lingam et al., "Waveform capture based ultrasonic sensing water flow metering technology," Texas Instruments Application Report SLAA889, Mar. 2019, Texas Instruments Incorporated, Dallas, Texas, 10 pages.

(Continued)

*Primary Examiner* — Nathaniel T Woodward
(74) *Attorney, Agent, or Firm* — Dorsey & Whitney LLP

(57) ABSTRACT

A method for detecting fluid consumption that includes: detecting, by a fluid meter mounted on an exterior of a pipe containing fluid, a first time of flight between a first ultrasonic transducer and a second ultrasonic transducer; detecting, by the fluid meter, a second time of flight between the second ultrasonic transducer and the first ultrasonic transducer; determining a time of flight difference between the first time of flight and the second time of flight; determining a volumetric flow rate based on an environmental correction parameter and the time of flight difference; and generating a fluid volume consumption total for fluid flowing through the pipe based on the volumetric flow rate.

8 Claims, 15 Drawing Sheets

(56) References Cited

U.S. PATENT DOCUMENTS

2019/0011300 A1* 1/2019 Gloss .................. G01F 25/10
2019/0025112 A1* 1/2019 Ploss .................. G01F 1/667
2019/0154480 A1* 5/2019 Schöb ................. G01F 15/02
2020/0326216 A1* 10/2020 Sarkissian ............ G06Q 50/06

OTHER PUBLICATIONS

Marioli et al., "Digital Time-of-Flight Measurement for Ultrasonic Sensors," IEEE Transactions on Instrumentation and Measurement, (1992), 41(1):93-97.

* cited by examiner

WATER METERING DEVICE AND METHODS FOR WATER CONSUMPTION APPORTIONMENT

CROSS REFERENCE TO RELATED APPLICATIONS

This application claims priority to U.S. Provisional Application No. 63/031,657 titled "Water Metering Device," filed on May 29, 2020, and incorporated by reference for all purposes herein.

BACKGROUND

Conventional water meters, such as "invasive" water meters (i.e., those installed inline), may be difficult to install in pipes already in use. For example, installation of invasive water meters may require water shut-off and physical alterations to existing pipe. Additionally, installation of invasive water meters often requires plumbing expertise. Alternative flow meters may be easier to install, but may be less accurate than conventional water meters. As such, many locations with multiple water consumption sources do not have easily implemented manners in which to apportion water consumption between different sources. For example, certain multiple occupancy buildings or locations (e.g., apartment buildings, condominiums, camping grounds, recreational vehicle parks, etc.) may have different tenants or users that may consume different amounts of water, but apportionment between tenants is difficult or inaccurate, such that all costs may be applied evenly to all tenants, rather than fairly based on consumption.

SUMMARY

Example systems are described herein. An example system includes a non-invasive fluid flow meter wirelessly connected to a base station, where the base station provides internet connectivity. A cloud computing environment includes one or more processors and is connected to the internet. The cloud computing environment provides an internet-based interface for communication with the non-invasive fluid flow meter and provides infrastructure for communications between the non-invasive fluid flow meter and third party software.

As another example, a fluid meter is disclosed that includes one or more onboard sensors and a power manager. The power manager is configured to operate the fluid meter at a low power state and transition the fluid meter from a high power state upon a threshold condition determined based on one or more environmental conditions detected by the onboard sensors. The fluid meter may also include a wireless communications interface configured to communicate an alert to a user device based on the threshold condition.

In yet another example, a fluid meter is disclosed. The fluid meter includes a housing, an ultrasonic transducer, and a coupling member coupled to the ultrasonic transducer. The coupling member compresses a fixed amount when the fluid meter is coupled to a pipe.

In another example, a method for determining fluid consumption is disclosed. The method includes detecting, by a fluid meter mounted on an exterior of a pipe containing fluid, a first time of flight between a first ultrasonic transducer and a second ultrasonic transducer; detecting, by the fluid meter, a second time of flight between the second ultrasonic transducer and the first ultrasonic transducer; determining a time of flight difference between the first time of flight and the second time of flight; determining a volumetric flow rate based on an environmental correction parameter and the time of flight difference, the first time of flight, and the second time of flight; and generating a fluid volume consumption total for fluid flowing through the pipe based on the volumetric flow rate.

In another example, a system for water usage detection is disclosed. The system includes a fluid flow meter communicatively coupled to a network and positioned completely externally to a fluid flow pipe that delivers fluid to a unit; one or more processors communicatively coupled to at least one of the fluid flow meter and the network, where the processors are configured to analyze an estimated fluid volume flow rate detected by the fluid flow meter to determine a fluid consumption volume for the unit over an interval, generate a fluid consumption cost for the unit, and output the fluid consumption cost to a user device via the network.

In yet another example, a fluid meter for installation on an exterior of a fluid pipe is disclosed. The fluid meter may include a housing and at least one ultrasonic transducer positioned at least partially within the housing, and a compressible coupling member coupled to the least one ultrasonic transducer and configured to be positioned between the at least ultrasonic transducer and the exterior of the fluid pipe, wherein the compressible coupling member compresses a fixed amount upon application of a clamping force to the housing.

BRIEF DESCRIPTION OF THE DRAWINGS

The description will be more fully understood with reference to the following figures in which components are not drawn to scale, which are presented as various examples of the present disclosure and should not be construed as a complete recitation of the scope of the disclosure, characterized in that.

DETAILED DESCRIPTION

Figure 1:
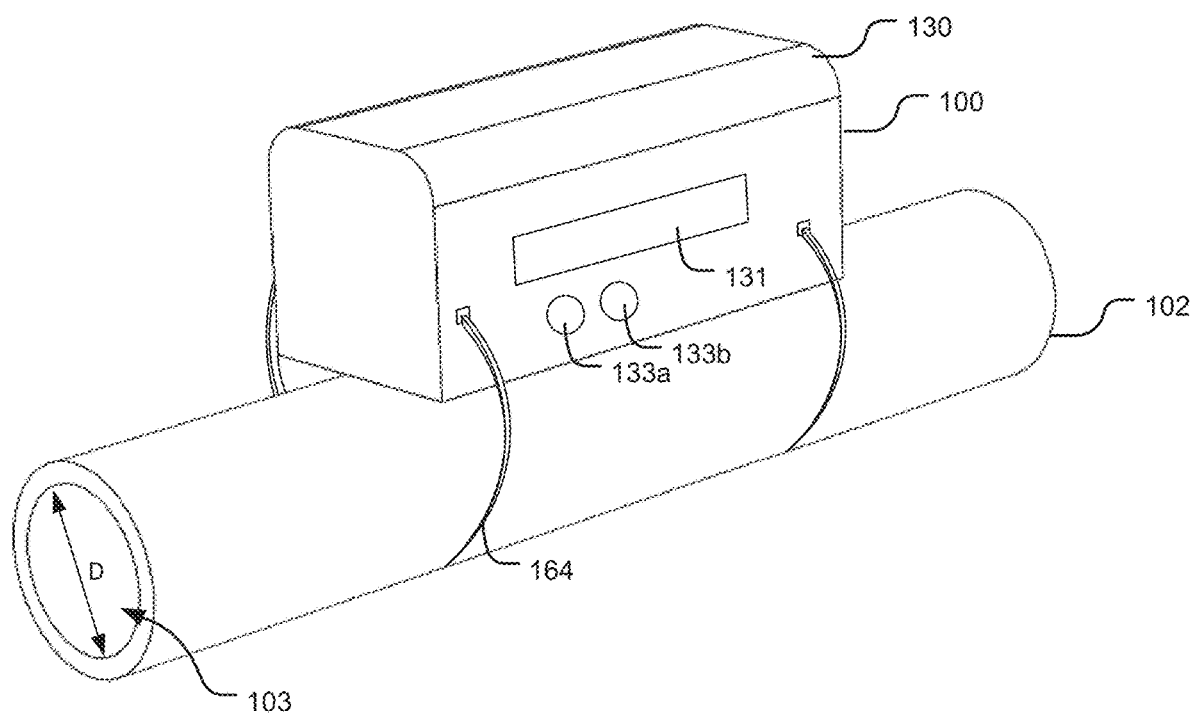
FIG. 1 is a perspective view of an example water metering device mounted on a pipe.

Water submetering allows a multi-dwelling unit property owner with a single, master water meter to bill tenants accurately on a per unit basis. As the cost of water increases, submetering is becoming more common. However, the initial cost to implement submetering in both time and money is significant. Typical water submeter installation can be invasive, involving shutting off water to the premises and a plumber cutting pipes to install a meter inline, e.g., conventional invasive water meters are used. Embodiments described herein include a non-invasive, over the pipe water submeter with sufficient accuracy that the data output can be used for billing purposes, e.g., to accurately bill select units with specific water costs associated just to that unit. Additionally, the device and techniques described herein allow water submetering at a lower cost and with less intrusion than traditional submeters. For example, the device can be installed by a user, even those without technical training, quickly (e.g., in about 5 minutes), without special tools or training.

As one example, water meter device is disclosed that includes one or more ultrasonic sensors that allow detection of water flow characteristics within a pipe via ultrasonic signals, where the sensors do not need to be positioned within the interior of the pipe. Rather, the sensors can detect information from the exterior of the pipe, allowing the water meter to detect water flow characteristics externally. The water meter may be installed on the exterior of a water pipe specific to a particular unit, tenant, or the like, e.g., at the water inlet to the unit and track water usage specific to that unit, tenant, or the like.

In one example, the water meter may include one or more external water characteristic sensors (e.g., ultrasonic sensors), a processing element, and input/output interface (e.g., radio or networking chip). The water meter may detect water flow characteristics of water flowing within the pipe and transmit the water flow characteristics to another device (e.g., server, smartphone, computer, etc.) for analysis or as part of notifications that are generated. In other embodiments, the water characteristics may be analyzed locally at the water meter.

In some embodiments, the water characteristics as-detected may be adjusted to be tailored to the specific environmental factors of the water meter installation environment, which may help increase sensitivity and accuracy of the water meter and system. As one example, environmental adjustment or installation parameters (e.g., coefficients and/or offsets) may be determined and can be applied to the detected signals or information to adjust or correct the signals or information to take into account environmental factors for the particular meter. The number of environmental factors or characteristics (e.g., pipe material, pipe diameter, ambient temperature, water temperature, etc.) accounted for may vary depending on the accuracy and precision desired.

The environmental adjustment parameters (e.g., coefficients and/or offsets) may be determined based on data sets that are analyzed to optimize for average error, maximum error, and/or standard deviation. The data sets may include data for different pipe materials, pipe diameters, ambient temperatures, water temperature, pipe manufacturers, pipe manufacturing lots or batches, manufacturing tolerances, meter location (e.g., geographic location which may have different water characteristics, ambient temperatures, etc.). More or fewer environmental adjustment parameters may be analyzed and adjusted for based on a desired sensitivity, accuracy, or the like.

Utilizing the determined water characteristics, the system may determine a water flow volume through the water pipe at a given time or period, where the water pipe may be specific to a particular tenant, unit, plot, or the like (e.g., not a "community" or multiple unit outlet, such as a main water line or an inlet to an entire building). Based on the water flow volume through the water pipe individualized to the particular unit, the system can then accurately determine water usage by that unit. Such individualized use information enables the system to apportion a water consumption cost (e.g., bill) to the particular unit for their individualized use, allowing fair disbursement of water costs across multiple units or tenants. In some embodiments, the system may interface with one or more billing platforms or services to automatically add the individualized water usage to the unit's bill (e.g., for rent or other utilities). As such, the systems and methods described herein may allow a single water consumption cite to be broken into more discrete water consumption pieces to allow fair and accurate allocation between different users.

As mentioned, the water meter may include externally mounted sensors configured to detect water flow characteristics. In some examples, these sensors may be ultrasonic transducers that utilize time of flight differences between emitted and received ultrasonic sounds waves to capture water flow data. There may be multiple ways in which to utilize the ultrasonic soundwaves to determine water flow rate.

Generally, ultrasonic time of flight can be used to determine flow rate using two measurements to determine ultrasonic time of flight difference. The time for an ultrasonic chirp or ultrasound wave emission to travel from the left to right transducer is measured ($ToF_{up}$) and the time for an ultrasonic chirp to travel from the right to left transducer is measured ($ToF_{down}$), e.g., one transducer may be located upstream and the other downstream and the time detected is the time of the signal to reach the other. These measurements are typically on the scale of tens of microseconds. The time of flight difference ($ToF_{diff}$) is represented by the difference between the $ToF_{up}$ and the $ToF_{down}$.

In order to capture an accurate $ToF_{diff}$ measurement, it is often necessary to use an analog-to-digital converter to capture samples of the ultrasonic signal at greater than the Nyquist frequency. A cross-correlation and interpolation of the Up and Down samples is implemented to generate $ToF_{diff}$. An example of this type of measurement can be found in MARIOLI et al.: DIGITAL TIME-OF-FLIGHT MEASUREMENT, published by IEEE Transactions on Instrumentation and Measurement, Vol. 41, No. 1, February 1992, incorporated by reference herein for all purposes.

The difference between the two times (i.e., $ToF_{diff}$) is related to the flowrate of the water because the velocity of the water flow acts on the ultrasonic signal an equal and opposite amount in the Up direction compared to the Down direction. The $ToF_{diff}$ is generally several orders of magnitude smaller than the time of flights, typically on the scale of nanoseconds.

If water temperature is not known, the velocity of water flow and volumetric flow rate can be calculated using equations Eq. (1) and Eq. (2) as follows:

$$\text{Water Velocity} = (\text{Ultrasonic path length}/2) * (ToF_{diff} / (ToF_{up} * ToF_{down})) \quad \text{Eq. (1)}$$

The water velocity may be converted to a volumetric flow rate using the below formula:

Volumetric Flow Rate (VFR)=Water Velocity×Cross-Sectional Area, where cross-sectional area=$\pi r^2$ and r is the radius of the inner diameter of the pipe. Eq. (2)

Accordingly, VFR may be calculated by combining the previous two equations, such that $VFR = Coef_{VFR} * (ToF_{diff}/(ToF_{up}*ToF_{down}))$ where $Coef_{VFR} = (Ultrasonic\ path\ length/2)*\pi r^2$ Eq. (3)

For conventional water meters installed inline within a pipe the inner diameter of pipe and ultrasonic path through the water are known for a given meter (as opposed to non-invasive applications). With externally mounted or non-invasive water meters, post-manufacturing calibration may be completed to eliminate manufacturing tolerances and achieve the desired accuracy of the meter. The output of the calibration is a set of environmental parameters, such as general coefficients and offsets, and possibly offsets to the $ToF_{diff}$, $ToF_{up}$, and/or $ToF_{down}$ as well.

For example, for a given meter, select coefficients or offsets (including offsets for $ToF_{diff}$, $ToF_{up}$, and/or $ToF_{down}$) may be programmed into the meter software before the meter is shipped (or otherwise before installation by a consumer). In some cases there are a few sets of variables (e.g., $Coef_{VFR}$ and Offsets) for different ranges of flow, or some slight variation. In addition, this type of calibration can apply to any velocity-based flow meter such as turbine, vortex, and electromagnetic meters. However, for some water meters, such as those installed outside of the pipe, such calibration techniques will typically result in inaccurate results, as the physical section of pipe and other environmental parameters is not known and cannot be accounted for at the time of manufacture only.

As such, in some embodiments, the water meter of the present disclosure, which is configured to be externally or non-invasively mounted, may have environmental parameters selected based on an analysis to increase accuracy across multiple conditions and environmental characteristics. As one example, a variety of water pipes may be sampled and characterized across different environmental conditions. This data and characterization is used to select environmental correction parameters (e.g., $Coef_{VFR}$ and Offsets) that maximize accuracy across most or all conditions for a given material and size of pipe. By utilizing environmental correction parameters that have been selected based on multiple conditions, the water meter can be more accurate in more installation locations than with other techniques.

A typical goal of a flow meter is to measure total usage, in gallons for example. This total usage may be calculated using, for example by the following equation:

Total Usage=Previous Total Usage+(VFR*Time between VFR measurements). Eq. (4)

With Eq. (4), if the $ToF_{up}$ and $ToF_{Down}$ measurements are taken every 0.5 seconds, then this sampling time (e.g., 0.5 seconds) is the "Time between VFR measurements." As such, utilizing ultrasonic transducers and appropriately selected environmental correction parameters, an external or non-invasive water meter can detect data that may be useful for determining total water usage or volume.

Turning to the figures, the features of the present disclosure will be discussed in more detail. FIG. 1 is an isometric view of a non-invasive water metering device 100 or flow meter positioned on or installed on a flow pipe 102. The flow pipe 102 may define a flow passageway 103 therein, where the inner diameter D of the flow passageway 103 may be defined by the thickness of the pipe 102 walls as well as the diameter of the pipe, in many instances the internal or flow diameter of the passageway 103 may be a factor in the environmental correction parameters. The flow pipe 102 may generally correspond to a water system to deliver water to one or more water consuming devices (e.g., toilet, shower, sink, washing machine, irrigation, etc.). In many instances, the flow pipe 102 may be the inlet to a select unit (e.g., apartment or plot) that delivers all or most of the water for that selected unit, where the flow pipe 102 may be fluidly connected to a water source (e.g., main water line from a water utility source or the like). As can be appreciated, by mounting the water metering device 100 on the flow pipe 102, the water metering device 100 can detect water usage by water being delivered by the flow pipe 102 to the unit.

The water metering device 100 may use similar calculations to those described, including Eqs. (1)-(4) and/or specific environmental correction parameters to detect water characteristics and measure total water usage and/or Eqs. (5) and (6) described below. The flow meter of FIG. 1 may be installed outside of a flow pipe 102, such as on or adjacent to the exterior surface of the flow pipe 102, and therefore may be considered to be non-invasive or otherwise exterior to the flow pipe. In one embodiment, fasteners 164, such as zip ties, adhesive, clamps, or the like, may be used to secure the flow meter 100 to the exterior of the pipe 102. In these embodiments, the fasters 164 may be easy to install by the user, as well as may allow the device 100 to be readily removed, and may not require cutting into or damage to the pipe 102.

As shown in FIG. 1, the entirety of the water metering device 100 can be located outside of a pipe 102 (i.e., there are no sensors positioned within the flow lumen 103 defined by the pipe 102), but as noted, such installation may add additional variables, such as pipe thickness, pipe temperature, and pipe material, to the calculations, and these variables may change for each installation, e.g., for each pipe and flow system that the meter is installed. In such instances, the water usage calculations may be inaccurate unless the pipe variations and environmental factors are taken into account. In many instances, environmental factors may be determined (e.g., input by the user or detected by the device 100 or other component), and environmental correction parameters may be used to select a volumetric equation for the device that is tailored to the installation environment.

In some embodiments, the water metering device 100 may measure total water usage accurately by adjusting Coefficient(s) and Offset(s) at one or more times during the life of the device 100. For example, in some implementations, the device 100 may be calibrated at the time of manufacture, before shipping, at installation, and/or during use as environmental conditions change. Further, the device 100 may include materials, such as a soft material with a fixed compression, between the transducers and the pipe to offset variations in installation of the device 100. The combination of additional calibration instances or calibrations, as well as device characteristics, allow the device 100 to be accurate in sampling water flow, even in very different environmental characteristics or where an initial calibration (e.g., one done at a factory) is not accurate for the particular environment.

Figure 2:
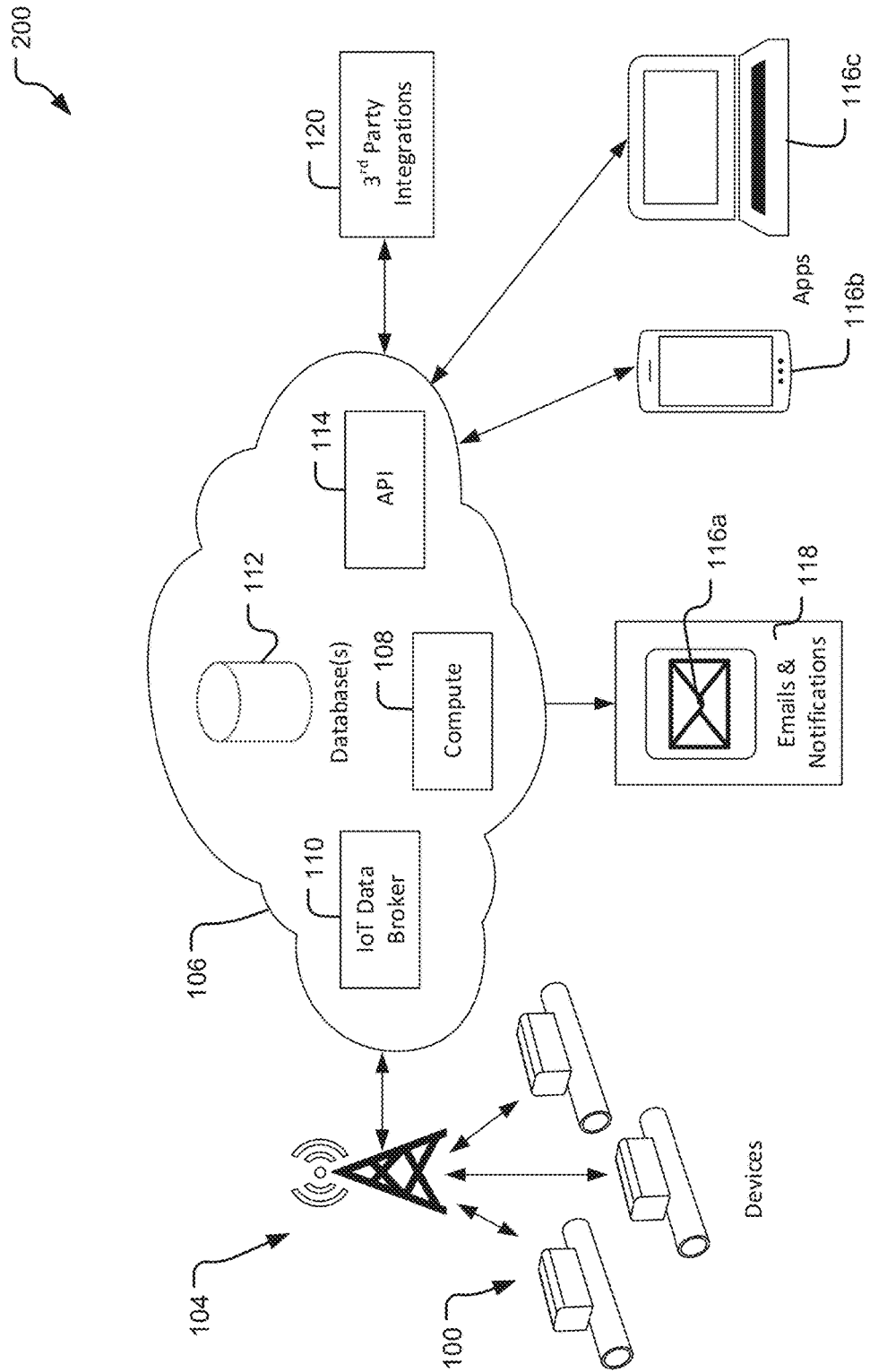
FIG. 2 is a schematic diagram of an example system including example water metering devices.

FIG. 2 shows an example system 200 including one or more water metering devices 100. The water metering device 100 may include a communication component that transmits and/or receives data between one or more computing devices, such as via one or more networks. As one example, the water metering device 100 may communicate data (either directly or indirectly) to a base station 104 (e.g., a cell tower, IoT hub, or the like) that connects to another network 106, such as the Internet, e.g., may be connected via a wireless signal. In this example, the water metering device 100 may transmit data without requiring a local area network, such as a local WiFi, allowing installation to be seamless and not require a user an extra step of coupling the device 100 to the local WiFi or other network. However, in other embodiments, different communication mechanisms and networks may be used, such as, but not limited to, WiFi, Bluetooth, and other radio wave techniques.

The example system 200 may include fluid flow metering devices (e.g., water metering device 100), network hosted components such as one or more databases 112, user devices 116a, 116b, 116c (e.g., computers, smartphones, tablets, wearable devices, etc.), computer components 108 (e.g., servers, workstations, microprocessors, data brokers, and so on), all of which may be configured to communication with one another via one or more networks 104, 106. To that end, various communication interfaces, such as application programming interfaces (APIs) 114, web portal 118, mobile applications, and integrations 120 to third party software such as tenant management and billing software, are contemplated. In some instances, the device 100 may be in communication with one or more computing devices (e.g., servers, user devices, etc.) via a network connection and/or other communication mechanisms. In some embodiments, certain calculations and processing may be completed onboard the device 100, whereas in other embodiments, certain calculations or analysis may be completed by various computing components in communication with the device, e.g., a cloud computing environment. As such, any particular operation or functionality should be understood as being able to be completed on or off the device.

The device 100 may be configured to transmit notifications and other data to one or more other devices (e.g., user devices, databases 112, servers 108, or the like) at different conditions, such as, but not limited to, leaks, freeze condition, threshold water consumption, water consumption usage, tampering, low battery, or other event or condition is detected. For example, the device 100 may include sensors or receive data corresponding to information, such as environmental factors (e.g., temperature or unit occupied status) to determine if a leak has occurred. In some implementations, the device 100 may connect wirelessly (e.g., via Bluetooth) to motion, temperature, or other sensors to determine vacancy and temperature within a unit. For example, the device 100 may connect with one or more internet of things (IoT) devices and/or standalone sensors. In other examples, the device 100 may include onboard sensors or communicate with computing devices outside of the installation environment that can provide the environmental characteristics. In some implementations, the device may have onboard sensors to measure, for example, freezing conditions or tampering with the device. The sensors may be used to determine if a water flow is expected or is connected with a potentially damaging leak.

The notification, alert, and other information can be provided to user devices 116a, 116b, 116c corresponding to tenants, owners, property managers, HOA managers, maintenance staff, first responders, or other relevant parties via one or more devices 116a, 116b, 116c. In some implementations, the device 100 may operate in a low-latency mode, such that the device 100 can transition to an increased power level upon a threshold condition to issue a notification or alert regarding the threshold or alert condition, which can reduce power consumption while allowing quick responsiveness as needed. As an example, utilizing one or more sensors, the device 100 may determine water flow above a predetermined threshold (e.g., typical usage threshold, average use, historical use, or the like), as this occurs, a power manager may instruct the power regulator to transition the device 100 to high powered state. From the high powered state, the device 100 may then determine whether a leak has occurred (either onboard or via the cloud) and then may transmit (e.g., via the network) an alert or other notification to a user device with the information.

Data transmitted from device 100 as indicated in FIG. 2 may be determined periodically or at other intervals, processed by the data broker 110 or other computing element in communication with the device 100 and stored in a database 112. In some implementations, data may be rolled up and delivered to users via email, notification, $3^{rd}$ party integration, via an app or through some other mechanisms. For example, the user devices can access data from the device 100 via a web portal on a user device 116a and/or an application installed on the user device 116b. This allows users to access the data directly to utilize the data to determine individual water consumption, such as to add an individual water consumption cost or bill to tenants at an individual level, which may be done at regular intervals, based on user requests, or the like. In other examples, the system 200 may automatically determine the water consumption per unit and determine the charge for the particular unit. In these examples, the device 100 may interface with third party platforms 120 to allow the system 200 to generate invoices for the water usage and/or include the water consumption costs into another invoice (e.g., rent or utility) for the unit. In these examples, apps on the user devices may receive data from users such as billing information, property addresses, tenant information, etc. as well as to deliver data and notifications to users. Alerts can also be initiated via devices, such as the user devices 116a, 116b, 116c, through the cloud or network 106 and to users via apps, emails, SMS or other notification means in a short period. Finally, there are $3^{rd}$ party integrations to systems such as tenant management and billing software.

Figure 3:
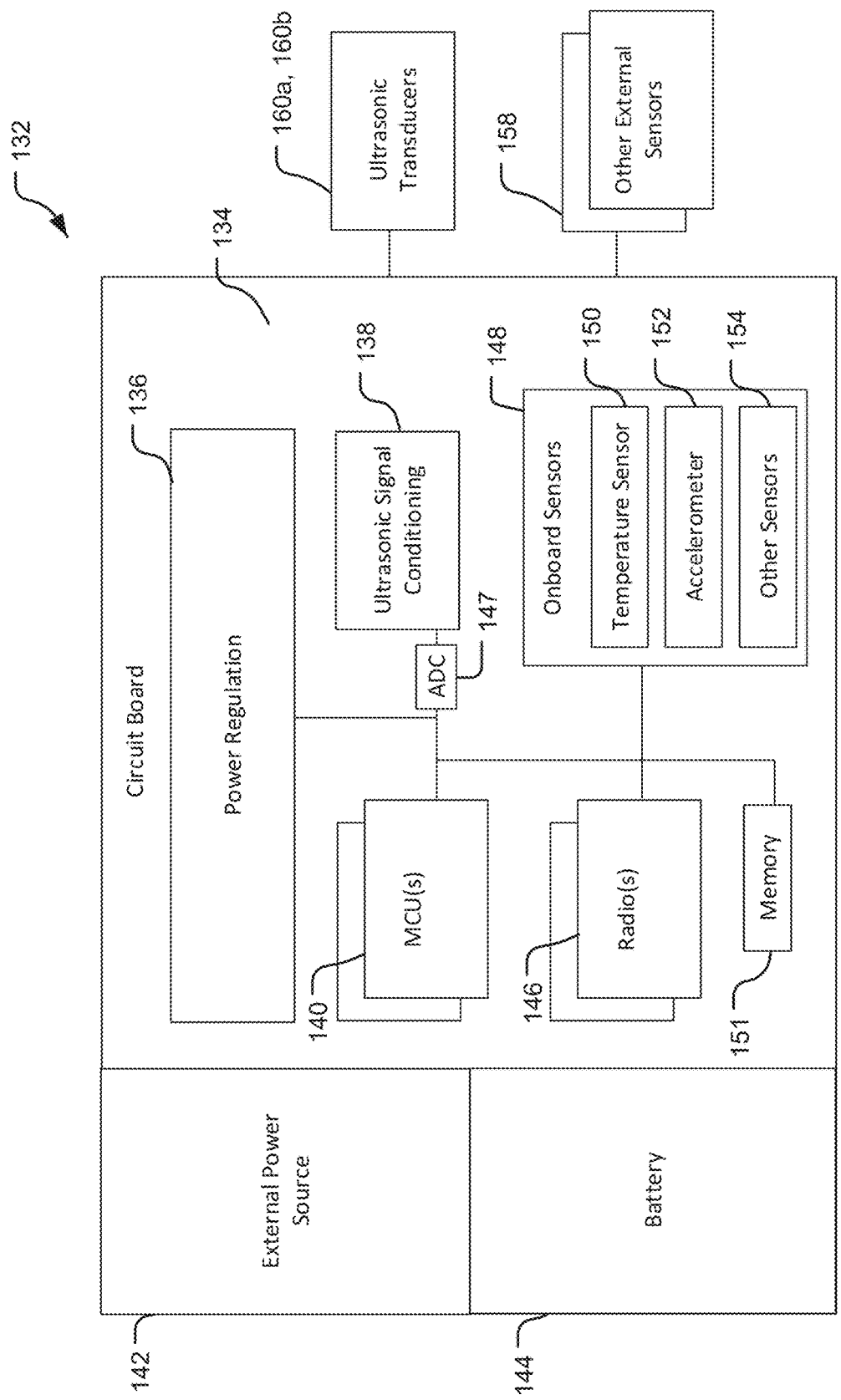
FIG. 3 is a block diagram of an electrical layout for an example water metering device.
Figure 4:
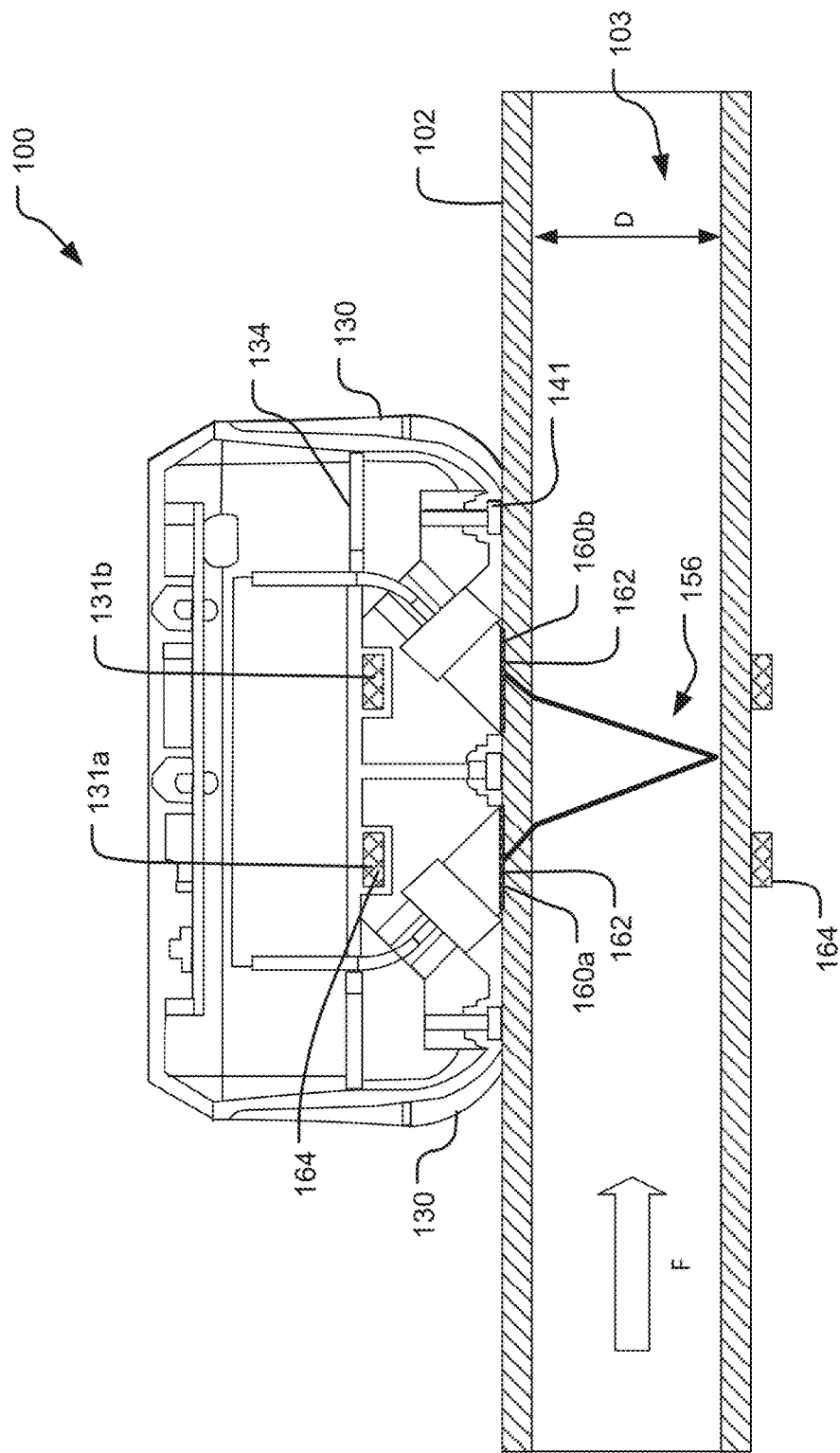
FIG. 4 is a diagram showing example measurement of time of flight using an example water metering device.

FIG. 3 illustrates a block diagram of select components of the device 100 and FIG. 4 illustrates a cross-sectional view of the device 100. With reference to FIGS. 3 and 4, the device 100 may include a housing 130, which may include a user interface 131 or user control buttons or elements 133a, 133b, as well as a detection assembly 132 including at least one circuit board 134 and a pair of ultrasonic transducers 160a, 160b (which may be received at least partially within the housing). Various components of the device 100 will be discussed, in turn, below.

The housing 130 may house one or more components of the device 100. The housing 130 may be defined as a hollow or substantially hollow shell that receives and protects select components of the device 100. In one example, the housing 130 may be mounted or positioned on the exterior of the pipe 102 and secured thereto (e.g., via fasteners 164) to mount the device 100 on the pipe 102 and in position. For example, the housing 130 may include one or more apertures 131a, 131b that receive fasteners therethrough, e.g., zip ties may extend through the apertures 131a, 131b to wrap around the pipe 102 and secure the housing 130 to the pipe 102.

The housing 130 may include apertures to allow certain components, such as fasteners or mounting components and/or sensors, to extend therethrough. For example, as shown in FIG. 4, the housing 130 may include two or more apertures to allow portions of a mounting assembly to extend past a bottom wall of the housing 130. Additionally, the housing 130 may include apertures to allow the control buttons 133a, 133b, and/or user interface 131 to be in electrical communication with the detection assembly 132. In one embodiment, the control buttons 133a, 133b and the user interface 131 are shown on a side wall of the housing 130, but in other embodiments, these features may be mounted on a top wall of the housing 130, which may allow a user to more easily view and access them when the device 100 is mounted on the pipe 102.

A mounting assembly 141 may include the one or more fasteners or clamps 164 and a coupling member 162 that help secure the device 100 to the pipe 102. The coupling member 162 may include a compressible material and the fastener 164 or other securing component is selected to adjust the force exerted on the compressible material 162. As discussed in more detail below (see, e.g., FIG. 12), the compressible material 162 may have a fixed or set distance that it deforms upon applied force (e.g., a force applied from the clamp or fastener 164), which may assist in calibration and/or accuracy of the detection assembly 132. The compressible material 162 may be a neoprene rubber or other material with a predefined deformation within a selected force range.

With reference again to FIG. 3, the detection assembly 132 may include various elements that power and provide signals to detect characteristics of fluid flow through the pipe 102 and/or the installation environment. The detection assembly 132 may include one or more power sources (e.g., batteries 144 with an option for external power source 142s), power regulation components 136, processors or microcontroller(s) 140, analog to digital converter 147, radio(s), onboard sensors 148 (e.g., accelerometer 152s, temperature sensor 150l, ultrasonic signal conditioning 138, and other sensors). In some embodiments, various features of the detection assembly 132 may be mounted or secured together, such as on a circuit board 134 or substrate, that may be received within the housing 130. In these embodiments, the detection assembly 132 features may be in electrical communication with one another via one or more wire traces, but in other embodiments, the features may be in communication via wires, wireless transmission, or the like. As can be understood, such elements may be varied depending on the environment for the device 100 installation, desired functionality, and the like. For example, in various implementations, a power manager may control power regulation components. The power manager may be implemented using a microcontroller, logic circuits, or other The processor 140 or microcontroller may be any type of device that can retrieve and execute instructions or perform calculations. The processor 140 may be a microcontroller, processing element, microcomputer, or the like. In many instances, the processor 140 may receive information from the various components of the detection assembly 132 and analyze the information to generate alerts, transmit data to the network 106, or the like).

The power regulation 136 may act to regulate power provided to the various components and smooth out a power signal.

The ultrasonic signal conditioning 138 acts to optimize the signal for capture by the analog to digital converter. This may include filtering, fixed gain, adjustable gain, attenuation or other methods of signal conditioning. In some embodiments, the ultrasonic signal conditioning 138 may receive data from the ultrasonic transducers 160a, 160b, adjust as needed, transmit the adjusted signals to the analog to digital converter 147, which may convert the received signals from an analog signal to a digital signal, and then transmit the digital signals to the processor 140 or microcontroller.

The network interface 146, which may include or more radios, acts to transmit and receive data, such as from a base station 104 and/or network 106. The network interface 146 may also communicate data other wireless methods (e.g., BlueTooth) or via wired connections as desired.

The detection assembly 132 may also include one or more memory components 151, which may act to store data, software or operating instructions, correction tables or parameters, or the like. The memory components 151 may be non-transitory and may be any type or combination of memory. The memory components 151 may be an integrated component with the processor 140 and/or separate.

The temperature sensor 150 acts to detect ambient temperature in the installation environment, e.g., surrounding the housing 130 of the device 100. The accelerometer 152 can detect motion of the device 100, such as due to water flow within the pipe 102, which may provide additional information for the fluid characteristics. The accelerometer 152 can also detect motion of the device 100 in the case of unwanted tampering after the device has been installed. In this manner, the device 100 may be able to generate alerts in the event that the device has been moved or altered.

In addition to the onboard or in-housing 130 sensors 148, the detection assembly 132 may be in communication with one or more external sensors 158. The external sensors 158 may be wired or wireless and communicate data regarding other features of the installation environment that may be used to generate alerts or track fluid characteristics. Examples of other external sensors that may be used with the system include water quality, temperature, standing water detection, and motion detection sensors. The information detected by these sensors can be used with the detected flow rate by the device 100 and used to enhance and generate additional notifications and alerts to the user device.

The detection assembly 132 of the device 100 may also include ultrasonic sensors or ultrasonic transducers 160a, 160b. In one embodiment, there may be two ultrasonic transducers 160a, 160b that may be installed at different locations within the housing 130. The ultrasonic transducers 160a, 160b are configured to emit ultrasonic soundwaves or signals (e.g., "chirps") and/or receive reflected ultrasonic soundwaves. In some embodiments, the ultrasonic transducers 160a, 160b may be positioned at angles that emit the ultrasonic waves at a desired angle, as discussed in more detail below. In one embodiment, the ultrasonic transducers 160a, 160b may be mounted at an angle ranging between 30 to 50 degrees, and in some instances 45 degrees. The ultrasonic transducers 160a, 160b are positioned at an angle to help ensure that the generated chirps, when reflected from the opposing bottom surface of the pipe 102, will reflect towards and reach the other transducer. The frequency of the emitted soundwaves should be selected to be able to generate sufficient signals for a variety of pipe diameters, including smaller pipe diameters, such as ¾".

The data received from the ultrasonic transducers 160a, 160b may be transmitted to the processor 140 (e.g., via the ultrasonic conditioning 138 and the ADC 147), which may then analyze the data and transmit information to the network interface 146 for transmission to the other components of the system 100 as discussed in more detail below. As a specific example, the ultrasonic transducers 160a, 160b may detect data (e.g., ultrasonic signals) that can be used to determine volumetric flow rate through the pipe 102, which can be used to generate fluid consumption data, billing data, alerts, and the like.

To assemble the device, the detection assembly 132 may be positioned within the housing 130, e.g., may be mounted or secured to a location within the housing 130. The ultrasonic transducers 160a, 160b may be electrically coupled to the detection assembly 132, such as via one or more wires, and may be positioned within a sensing aperture 171a, 171b (see FIG. 12) defined on a bottom surface of the housing 130. In some embodiments, the ultrasonic transducers 160a, 160b may be angled within the housing 130 and may have an angled face or sensing surface that may define a plane configured to be oriented parallel to a flow axis of the pipe 102. The mounting angle of the transducers is selected such that the generated soundwave from each transducer will reach the other transducer, e.g., as one example, to maximize the received signal at each transducer. In this manner, the transducers 160a, 160b may be angled towards one another, e.g., in a mirrored configuration, such that the angled emitting or sensing surface may help direct the signal towards the other transducer. The coupling material 162 is then positioned and secured to the outer or exposed face of the ultrasonic transducer 160a, 160b, e.g., the coupling material 162 may be adhesively attached to the respective faces of the ultrasonic transducer 160a, 160b. In one embodiment, the coupling material 162 may have a thickness that allows the coupling material 162 to extend past a bottom surface of the housing 130, but may compress a predetermined distance d (see FIG. 12) upon a force, such as a clamping force, that is used to secure the housing 130 to the pipe 102. An example of this compression is discussed in more detail with respect to FIG. 12.

With reference again to FIG. 4, the securing members 164, such as zip ties, may be positioned within the fastening apertures 131a, 131 defined within the housing 130 and may wrap around the pipe 102. The fasteners 164 may be secured, such as tightened, causing the device 100 to be compressed onto the outer surface of the pipe 102. This force causes the coupling material 162 to compress by distance d, such that the bottom surface of the coupling material 162 may be substantially even with or in the same plane as a bottom of the housing 130. This may help ensure that the ultrasonic transducers 160a, 160b are spaced at a known distance from the outer surface of the pipe 102 regardless of the installation force, e.g., tightening force, applied by the fasteners 164.

Figure 5:
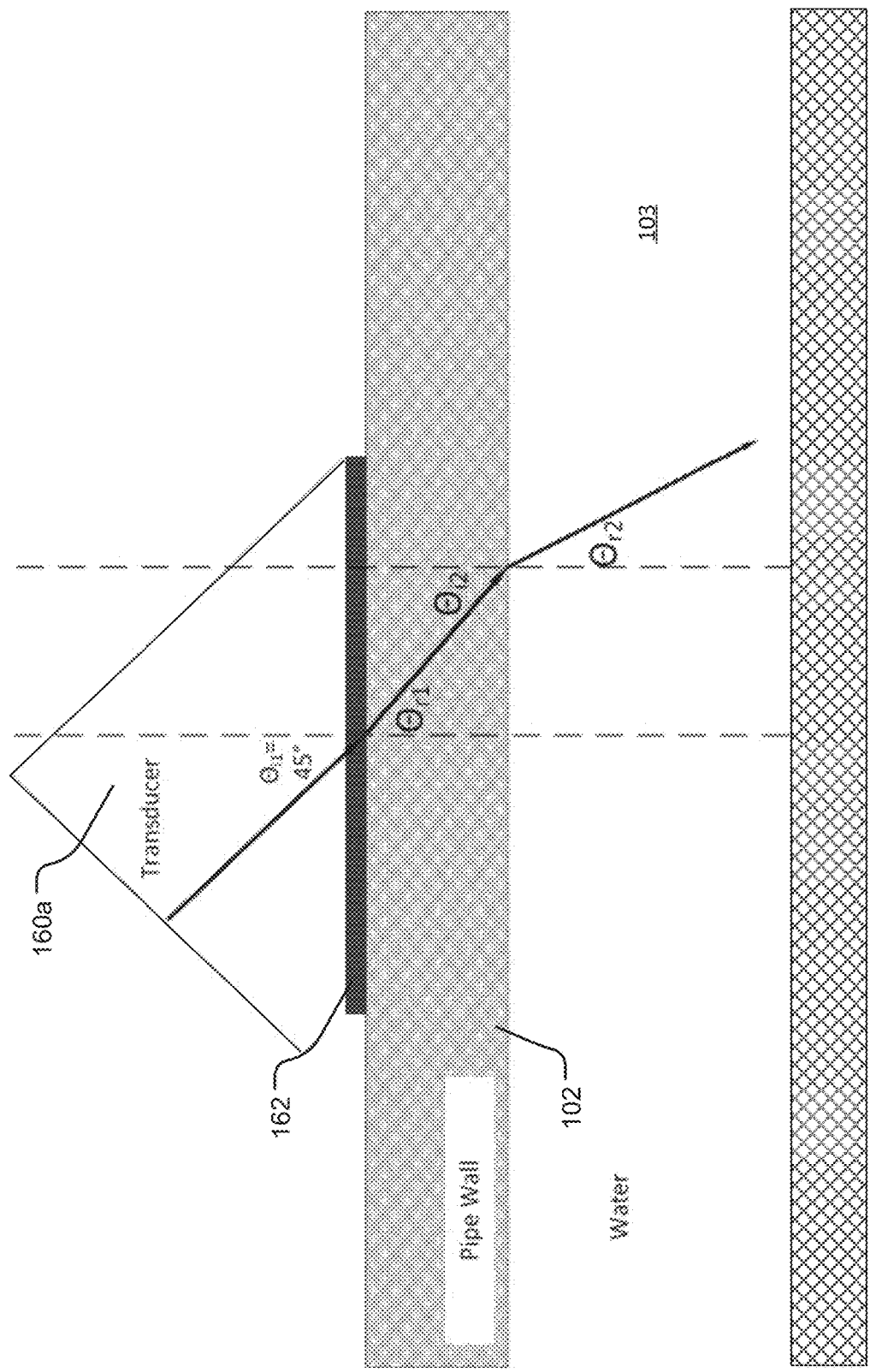
FIG. 5 is a diagram showing example measurement of time of flight using an example water metering device.

With reference to FIG. 5, as the device 100 may be installed on the outer surface of a fluid flow pipe 102, there may be additional challenges in non-invasive flow detection device that can impact the accuracy of the measurements. For example, with inline flow meters, the ultrasonic path length is typically set at fixed angles and distances on the invasive flow meter, which can be fixed because the device is installed within the pipe itself. However, with the device 100, the transducers 160a, 160b may be set at angles and the ultrasonic signal 156 travels through pipe 102, as shown in FIGS. 4 and 5. These additional transmission factors impact the $Coef_{VFR}$ and Offsets and thus the accuracy of the determined volume flow rate. These coefficients are fine-tuned to achieve significantly improved accuracy in a challenging, non-invasive application. The angles of the ultrasonic signal 156 paths can end up varying from the predetermined angles during installation, which can impact the accuracy of the detected signals and thus water data detected by the device 100.

As shown in FIG. 5, the ultrasonic signal 156 may not travel along the most direct angle from one transducer 160a, 160b to another. The ultrasound signal 156 travels at different speeds in different materials. Snell's law dictates that the angle of incidence ($\Theta_i$) and refraction ($\Theta_r$) are related to the speed of sound in the medium. Just as light bends when it goes between air and water, the same happens with ultrasound waves transitioning from one material to another. On top of this, the speed of the waves in each of the materials illustrated above changes with temperature.

Changes to the length and angles of the ultrasonic signal 156 path can generate significant errors in the volumetric flow rate measurement. While in some instances, these effects can be quantified and accounted for by measuring the temperatures of each material, these types of measurements can be challenging to determine in installed conditions for the meters 100. The transducer temperature can be measured with a temperature sensor outside the pipe (referred to as device temperature, ambient temperature, or installation environment temperature). The water temperature, however, may not be directly measured in non-invasive applications since the device 100 may not be positioned directly within the pipe. In addition, the ultrasonic path length is not known due to the variation in angles and material differences. In some embodiments of the non-invasive device 100, an equation such as Eq. (5) below can generate a VFR with desired accuracy when the $Coef_{VFR}$ and Offsets are generated as described herein.

$$VFR = Coef_{VFR} \frac{ToF_{diff} - Diff_{offset}}{(ToF_{up} - ToF_{offset})(ToF_{down} - ToF_{offset})} \qquad \text{Eq. (5)}$$

Equation Eq. 5 makes the assumption that the ultrasonic path is fixed, which is not always the case for non-invasive meters, e.g., many over the pipe flow meters may be installed in a manner that the path is variable, such as due to temperarture, movement of the pipe, different coupling forces attaching the meter of the like. Nevertheless, Eq. 5 may work well enough in some instances without further modification, depending on the desired sensitivity of the system. In order to generate volumetric flow rate (VFR) in this instance, $ToF_{diff}$, $ToF_{up}$ and $ToF_{down}$ are the variables that are measured at each sample period. In equation Eq. 5, the $Coef_{VFR}$, $Diff_{offset}$, and $ToF_{offset}$ are environmental correction parameters that are selected based on pipe and environmental conditions. These parameters may be fixed during operation of the device 100 in meter mode (e.g., while detecting flow conditions for alert generation) or may be modified based on different conditions for increased accuracy and/or precision. An example method for modifying these during post-install operation is described in FIG. 6 below.

Alternatively, a simple linear equation for VFR, as in Eq. 6 below, may be used in conjunction with post-install calibrations as a more flexible alternative to Eq. 5. The device 100 may be configured with either Eq. 5 or Eq. 6 to determine VFR. In Eq. 6 $ToF_{up}$ and $ToF_{down}$ are not directly included in the VFR equation but may be accounted for during the post-install calibration steps that may occur every measurement, based on some threshold conditions, or not at all. Due to the flexible nature of this method, it may be better suited to VFR calculations in non-invasive settings where the ultrasonic path length and angles change with temperature or other environmental conditions.

$$VFR = m_{VFR} * ToF_{diff} + b_{VFR} \qquad \text{Eq. (6)}$$

It should be noted that the following features and operations are described below based on Eq. 6 being used for the VFR calculations. However, as can be appreciated, either Eq. 5, Eq. 6, or other algorithms with suitable environmental correction parameters can be used as described below, with the appropriate substitution of parameters and variables from Eq. 6 into the desired equation. Further, the specific selection of environmental calibration parameters may vary based on the equation used.

Generally, flow pipes 102, such as those used in residential settings, may be manufactured differently or otherwise have varied characteristics, such as due to acceptable manufacturing tolerances, different manufacturing standards, corrosion and build up, variations in material, etc. As such, because the inner diameter of a 0.75" pipe may in reality be 0.77", the flow meter 100 may not be able to account for this at time of manufacture, especially as such characteristics may vary significantly from install environment to install environment. Such variation can impact determinations significantly, for example, the inner diameter of the pipe contributes to Volumetric Flow Rate (VFR) error, as shown in the VFR equation: Volumetric Flow Rate (VFR) =velocity*cross-sectional area, where cross-sectional area=$\pi r^2$. Therefore, the VFR is proportional to the square of the pipe radius making it a large factor even when the variation is only a few hundredths of an inch.

Variation due to manufacturing tolerances may be a factor for inline meters as well, but because the device 100 is a non-invasive meter, the system 100 may have to consider more tolerances than a typical inline meter. The tolerances can include, but are not limited to, transducer length, transducer face or piezo angle, material makeup, coupling thickness, plastic wall thickness, transducer piezo impedance, circuit board and electrical component tolerances. Accordingly, additional calibrations may be used to provide accurate water usage measurements.

Figure 6:
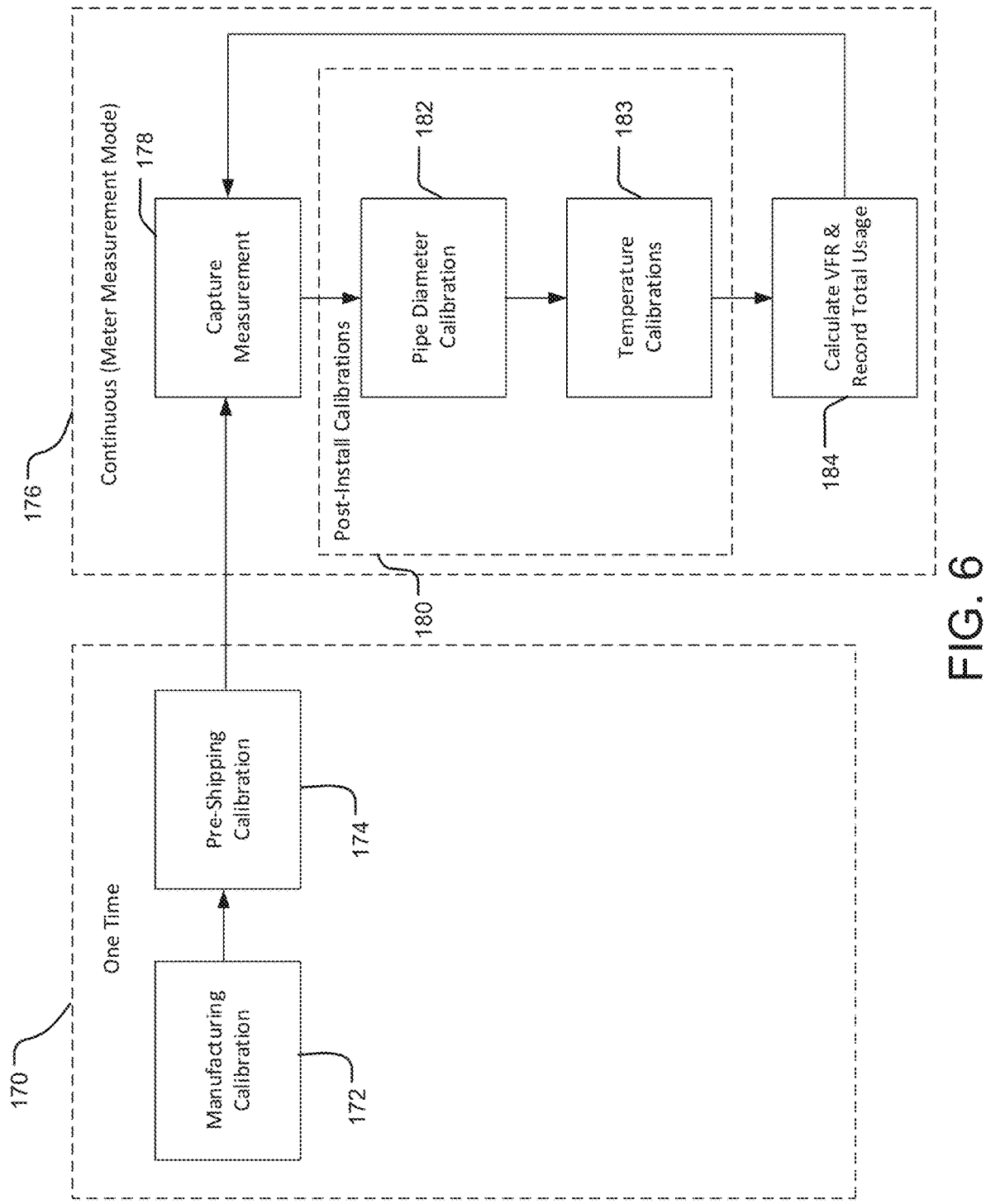
FIG. 6 shows example operations for calibration and correction of an example water metering device.

FIG. 6 shows example operations for calibration and/or correction of an example water metering device 100. As shown in FIG. 6, some operations for calibration or correction may be done once (e.g., at manufacturing completion), whereas others may be repeated periodically, such as at one or more intervals, as desired, e.g., before each measurement is stored. Examples of one time or initial calibration operations 170 may include a manufacturing calibration 172 and a pre-shipping calibration 174. These two operations 172, 174 may be substitutes for one another (e.g., either operation 172 or operation 174 are completed) or both may be done together to ensure higher accuracy. The manufacturing calibration 172 may be completed at various stages of manufacturing, but often may be completed after the detection assembly 132 is installed within the housing 130. The pre-shipping calibration 174 may typically be done after the device 100 is completely manufactured and often right before shipping to help ensure that any corrections to the hardware or software of the device 100 are made before the device 100 is sent to a user for installation. The manufacturing calibration 172 may include loading initial values and correcting for manufacturing tolerances, such as storing these values in memory or other components within the device 100. Pre-shipping calibration 174 may include fine-tuning initial values and further corrections for manufacturing tolerances for a particular pipe type and size.

With continued reference to FIG. 6, in some examples, lifetime or continuous calibration operations 176, such as those done while the device 100 is in metering mode and detecting flow rate, which may be performed at various intervals during use and may be done to help ensure accuracy over time. Examples of period calibration operations 176 include post-installation calibration 180, which may be done in conjunction with meter measurement operations 178, e.g., the device 100 capturing data that is used to detect flow conditions. In one example, post-install calibration 180 includes one or more real time calibrations that may calibrate detected data based on specific environmental characteristics, e.g., correcting for pipe diameter (rechecked for errors and leaks on a continuous basis) in operation 182 and/or calibrating for temperature 183. These real time calibrations may include correcting for speed of ultrasound in materials, path length and angle changes due to device temperature and water temperature. In one example, the device 100 may capture data corresponding to the flow conditions, e.g., receive data from the ultrasonic transducers, and then apply additional calibrations via operations 182 and 183 to further correct the data in light of the pipe diameter and water temperature, which may be in addition to the standard environmental correction parameters applied. This additional calibration may act to increase the accuracy and sensitivity of the device 100. From there, the corrected data may be used in operation 184 to calculate total VFR and volume consumption information over the detected period.

For example, such additional calibration operations may be used as adjustments, such as real-time correction coefficient, that may be applied to the baseline corrected data provided by the environmental correction parameters that may be pre-stored on the device 100. As a specific example, the device 100 may store environmental correction parameters (see tables below), that may be used to generate a VFR estimate, and the real-time calibration correction parameters may then be applied to update the VFR estimate to provide a further correction in light of the dynamic (e.g., water temperature) or other environmental conditions that may impact the shape of the soundwave and/or times of flight, or other characteristics of the ultrasonic soundwaves.

During operation (e.g., after installation), the device 100 may periodically detect measurements for time of flight up ($ToF_{up}$), time of flight down ($ToF_{Down}$), and device temperature. Calculations are made for time of flight difference ($ToF_{Diff}$)=$ToF_{Up}$−$ToF_{Down}$ using the cross-correlation and interpolation method. $ToF_{Total}$ may also be calculated as $ToF_{up}$+$ToF_{down}$.

During manufacturing, the device 100 may be loaded (e.g., stored on memory 151) with a parameter table of values for at least one type and size of pipe at the time of device manufacturing. The parameter tables stored on the device 100 may be selected based on the environmental characteristics, as well as the desired VFR calculation to be used. An example of a parameter table based on the use of Eq. 6 is illustrated below. In the event that another equation is being used, the parameters in the parameter table would be updated accordingly, i.e., the parameters below are meant as illustrative only.

TABLE 1

| Name | Definition |
|---|---|
| $M_{VFR-25C}$ | VFR equation coefficient at 25C device and water temperature for calculation as in Eq 6. The "baseline slope". |
| $B_{VFR-25C}$ | VFR equation offset at 25C device and water temperature for calculation as in Eq 6. The "baseline offset". |
| Transducer frequency | The transmit frequency of ultrasound sent into the transducers. |
| [$ToF_{Total-25C}$ -> Pipe I.D.] | Look up table with Input: $ToF_{Total-25C}$ Output: Pipe I.D. |
| [$ToF_{Total}$, Device Temperature -> | Look up table with inputs: $ToF_{Total}$, Device Temperature |

TABLE 1-continued

| Name | Definition |
| --- | --- |
| $\text{ToF}_{Total\text{-}norm}$] | output: $\text{ToF}_{Total\text{-}norm}$ |
| [$\text{ToF}_{Total\text{-}norm}$ -> Water Temperature] | Look up table with inputs: $\text{ToF}_{Total\text{-}norm}$ output: Water Temperature |
| [Device Temp -> $\text{MX}_{dev\text{-}temp}$, $\text{BX}_{dev\text{-}temp}$] | Look up table with input: Device Temperature outputs: Device Temperature slope and offset(s) VFR correction modifiers |
| [Water Temp -> $\text{MX}_{water\text{-}temp}$, $\text{BX}_{water\text{-}temp}$] | Look up table with input: Water Temperature outputs: Water Temperature slope and offset(s) VFR correction modifiers |
| [Pipe I.D. -> $\text{MX}_{pipe\text{-}id}$, $\text{BX}_{pipe\text{-}id}$] | Look up table with input: Pipe Inner Diameter outputs: Pipe I.D. slope and offset(s) VFR correction modifiers |

A parameter table may be generated for each $T_{x\text{-}y}$ shown in the table below as an example of the pipes and sizes supported:

TABLE 2

| | Pipe Size (Specified I.D.) | |
| --- | --- | --- |
| Pipe Material (type) | ¾" | 1" |
| PVC Schedule 40 | $T_{1\text{-}1}$ | $T_{1\text{-}2}$ |
| CPVC Schedule 40 | $T_{2\text{-}1}$ | $T_{2\text{-}2}$ |
| CPVC CTS | $T_{3\text{-}1}$ | $T_{3\text{-}2}$ |
| Copper Type M | $T_{4\text{-}1}$ | $T_{4\text{-}2}$ |
| Copper Type L | $T_{5\text{-}1}$ | $T_{5\text{-}2}$ |
| Copper Type K | $T_{6\text{-}1}$ | $T_{6\text{-}2}$ |

In one example, to generate the parameters for a given pipe material and size, data sets may be captured across various environmental and pipe factors, such as air or ambient device temperature, water temperature, pipe manufacturer and/or batch, pipe size within the standard tolerances, pipe material etc. The data one can capture includes $T_{diff}$, $\text{ToF}_{up}$ and $\text{ToF}_{down}$ data for a period of time at a flowrate known, using a calibrated, accurate flowmeter or known total volume using a method such as weight of the water. Using the data sets gathered, parameters can be generated for a given material and size of pipe using minimization techniques to optimize for average error, maximum error, and/or standard deviation etc.

For example, the parameter generation method may include capturing multiple data points at different installation locations or environments, where the data points are captured for different installation environments, such that the data points include flow rate information (e.g., as determined by a second device, such as an inline flow meter) or a predetermined volume amount) for the different environments. Using the dataset, the system 100 can then optimize the environmental parameters for select environmental installation characteristics. For example, a user can indicate the type of pipe 102, manufacturer of the pipe 102, and the device 100 can detect the ambient temperature and with these environmental inputs, the system 100 can determine the optimized environmental parameters based on the data set of analyzed environments.

The environmental parameters may be modified in any or all calibration steps. Measurements made during manufacturing that may impact the tables include but are not limited to transducer impedance, timing measurements, PCB and component impedances, physical distance measurements, etc. The Pre-shipping process 174 sets the parameters for a particular pipe type and size and/or selects the parameters to use for the particular type and size of pipe. During pre-shipping calibration, The device is calibrated for a particular pipe configuration before shipping. For example, a building may have ¾" PVC Schedule 40 pipe and all units for the building are calibrated at known flowrate(s), pipe I.D. (measured), and temperature (ambient and water). Based on this data, adjustments are made to values in the correction table, such as but not limited to $M_{VFR\text{-}25C}$, $B_{VFR\text{-}25}C$, and the [$\text{ToF}_{Total\text{-}25C}$->Pipe I.D.] lookup table.

Figure 13:
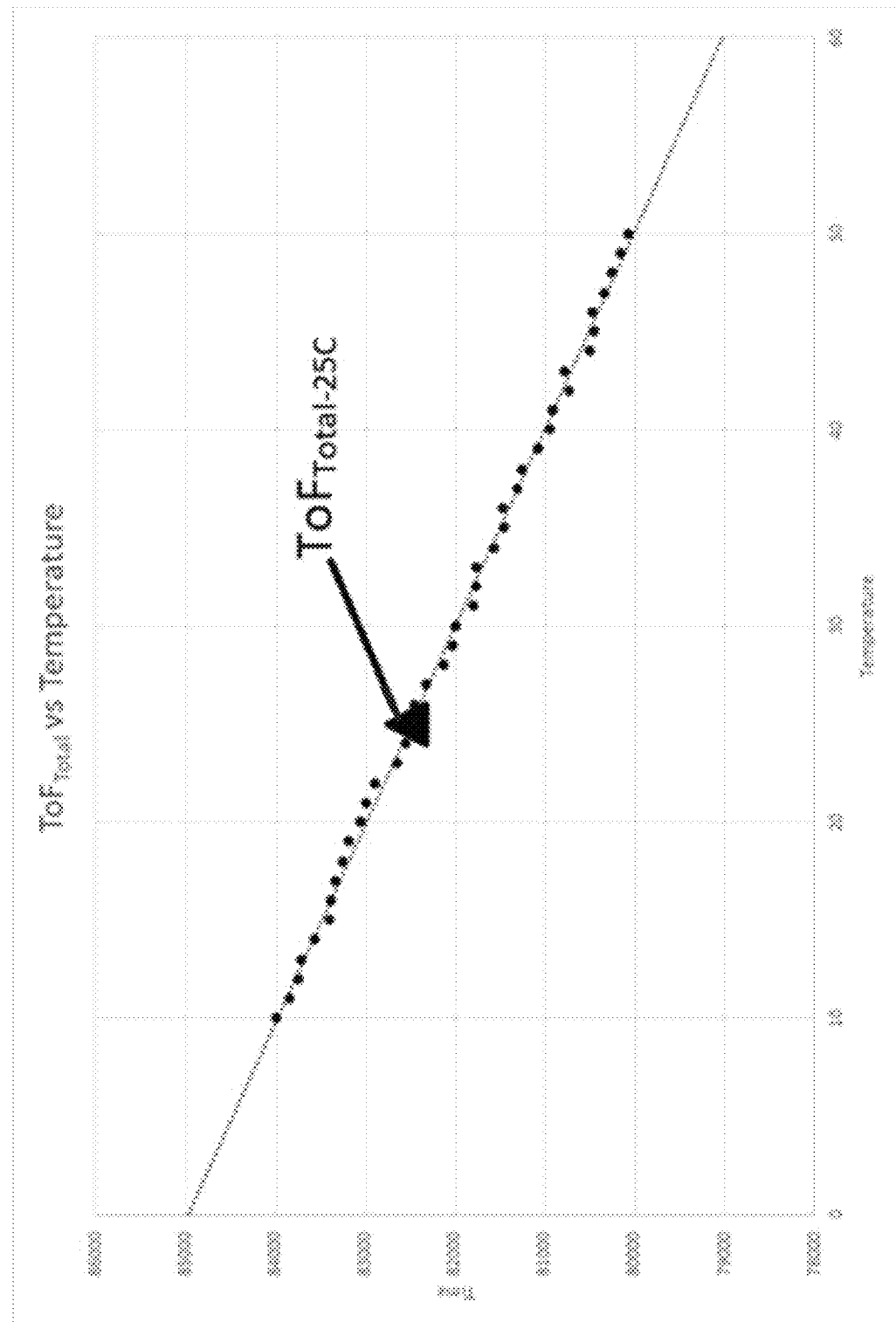
FIG. 13 illustrates an example of a graph for a first time of flight measurement versus temperature.

Post install calibration can correct for pipe diameter of the pipe the device is installed on. For a period after the device is installed on the pipe, data is gathered to generate a $\text{ToF}_{Total}$->Temperature data set. The data is gathered when certain conditions are met, including but not limited to $\text{ToF}_{diff}$ (Averaged over many measurements)<Threshold and Device Temperature having not varied more than a certain amount for a period. These conditions ensure that water has not been flowing and enough time has been given for the water temperature to match the device temperature. An example of this data is shown in FIG. 13.

The $\text{ToF}_{Total}$ changes with temperature because the speed of sound in the materials changes with temperature. If the speed of sound is faster at higher temperatures, as is the case in water, the $\text{ToF}_{Total}$ will be smaller as temperature goes up because the ultrasonic signals will travel between the transducers faster.

Using a method of interpolation and/or extrapolation, $\text{ToF}_{Total\text{-}25C}$ is determined from the data. $\text{ToF}_{Total\text{-}25C}$ is then used to estimate Pipe I.D. using the [$\text{ToF}_{Total\text{-}25C}$->Pipe I.D.] lookup table. Using the estimated Pipe I.D., parameters in the correction table can be updated, including but not limited to the [$\text{ToF}_{Total\text{-}norm}$->Water Temperature] lookup table.

Next, the Pipe I.D. VFR correction modifiers are generated using the [Pipe I.D.->$\text{MX}_{pipe\text{-}id}$, $\text{BX}_{pipe\text{-}id}$] lookup table. The post-install calibration may be run on a continuous basis for the life of the device to check for errors or leaks. If points stray too far from the original curve, this may indicate an issue. The device may be programmed to issue a warning or error message (e.g., to a user device) when points are farther than a specified distance from the original curve.

In some instances, such as where enhanced sensitivity may be desired, a real time correction operation 182 may be performed. In some examples, the real-time corrections 182 correct for path length and angle changes due to device temperature and water temperature. Either at every measurement, some fixed interval, or due to a trigger point in the measured values, the device 100 generates correction multipliers for the device and/or water temperature. First the water temperature is estimated by removing the device temperature contribution to $\text{ToF}_{Total}$ using the lookup table [$\text{ToF}_{Total}$, Device Temperature->$\text{ToF}_{Total\text{-}norm}$] and estimating the water temperature using the lookup table [$\text{ToF}_{Total\text{-}norm}$->Water Temperature]. Device temperature and water temperature multipliers are generated with the lookup tables [Device Temp->$\text{MX}_{dev\text{-}temp}$, $\text{BX}_{dev\text{-}temp}$] and [Water Temp->$\text{MX}_{water\text{-}temp}$, $\text{BX}_{water\text{-}temp}$].

A fine-tuned VFR coefficient and offset is determined using Pipe Diameter, Device Temperature, and Water Temperature VFR correction modifiers generated in the previous sections. For example, in one implementation, the following equations may be used to determine the VFR coefficient and offset: $M_{VFR} = M_{VFR\text{-}25C} * MX_{pipe\text{-}id} * MX_{dev\text{-}temp} * MX_{water\text{-}temp}$ and $B_{VFR} = B_{VFR\text{-}25C} * BX_{pipe\text{-}id} * BX_{dev\text{-}temp} * BX_{water\text{-}temp}$. In other implementations, the [$M_{VFR\text{-}25C}$, $MX_{pipe\text{-}id}$, $MX_{dev\text{-}temp}$, $MX_{water\text{-}temp}$->$M_{VFR}$]

lookup table and the [$B_{VFR-25C}$, $BX_{pipe-id}$, $BX_{dev-temp}$, $BX_{water-temp}$->$B_{VFR}$] lookup table may be used to determine the VFR coefficient and offset.

Once the VFR coefficient and offset(s) are determined, the device may calculate the VFR using the $ToF_{diff}$, the VFR coefficient, and the offset. For example, VFR may be calculated using the equation: VFR=$M_{VFR}$*$ToF_{diff}$+$B_{VFR}$. Total water usage may then be calculated using the VFR measurement and the previous water usage.

Figure 7A:
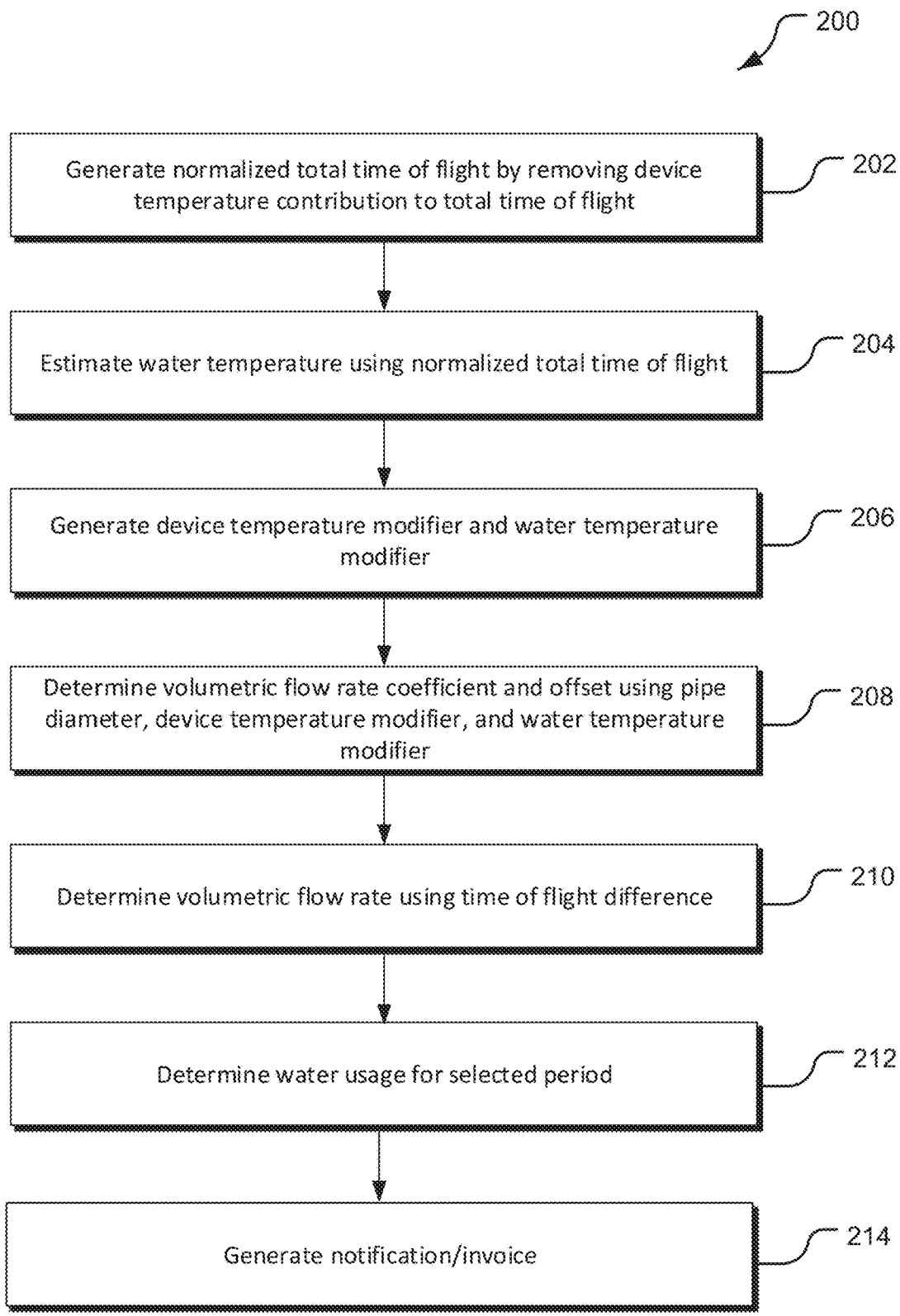
FIG. 7A is a flow chart illustrating a first method of detecting water usage.
Figure 7B:
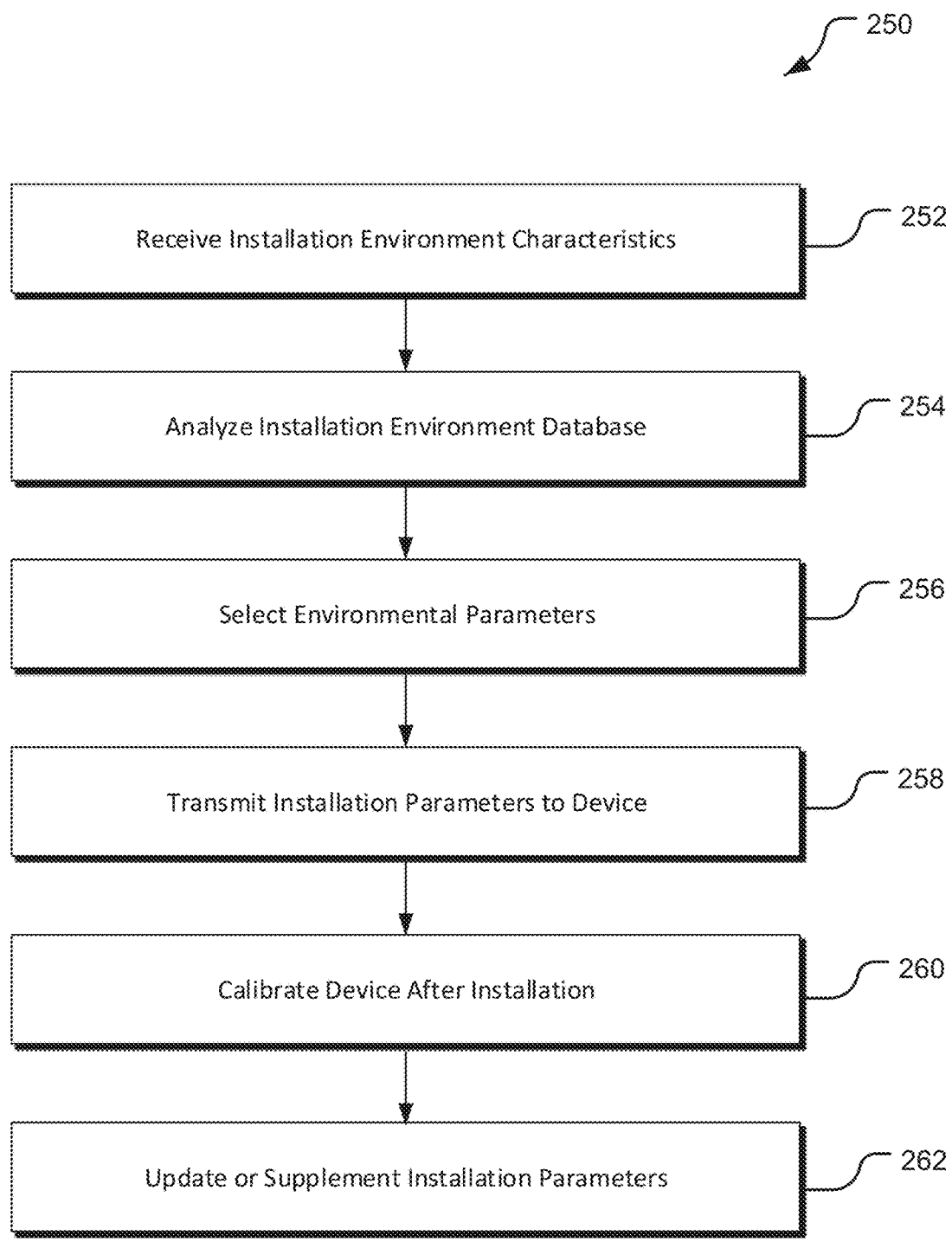
FIG. 7B illustrates a flow chart for a second method of detecting water usage.

FIGS. 7A and 7B illustrate various methods of utilizing the device 100 to determine water consumption. FIG. 7A shows a method 200 for example operations for real-time correction and calculation of total water usage using an example water metering device 100 that may apply Eq. 6 for generating VFR as specific temperature corrections may be completed. A first generating operation 202 generates normalized total time of flight by removing device temperature contribution to total time of flight. For example, the device 100 may actuate the ultrasonic transducers to emit the ultrasonic signals and detect the total time of flight from transmission to receipt. Based on this information, the device 100 may then utilize the temperature sensor 150 to determine an ambient temperature. Using both the ambient temperature and the total time of flight, the device 100 normalizes the time of flight. This can be accomplished with an equation or a lookup table such as the one in the example parameter table [$ToF_{Total}$, Device Temperature->$ToF_{Total-norm}$].

An estimating operation 204 estimates water temperature using normalized total time of flight. For example, the normalized time of flight accounts for differences based on the ambient temperature surrounding the device 100, such that the water temperature of the water within the pipe 102 can be estimated based on the normalized time of flight data. This can be accomplished using either an equation or a lookup table such as the example in the parameter table [$ToF_{Total-norm}$->Water Temperature] to generate an estimated water temperature.

A second generating operation 206 generates a device temperature modifier and a water temperature modifier. For example, the device 100 may use either equations or lookup tables such as the examples in the parameter table [Device Temp->$MX_{dev-temp}$, $BX_{dev-temp}$] and [Water Temp->$MX_{water-temp}$, $BX_{water-temp}$].

A first determining operation 208 determines volumetric flow rate coefficient and offset using pipe diameter, device temperature modifier, and water temperature modifier. For example, the environmental parameters are retrieved from a data based or the memory 151 based on Eqs. (1)-(3).

A second determining operation 2 determines volumetric flow rate using time of flight difference. In operation 212, a water usage or volume for a selected period is determined, this operation 212 may include analyzing the volumetric flow rate multiplied times the length of time for the desired period. The time period may be a desired sample rate, such as every 5 minutes, every 1 minute, every 30 seconds, or the like.

In operation 214, water usage information is generated for the particular pipe 102 over the set period of time. In some embodiments, a notification may be generated that provides the data to a third party system (e.g., interfaces with a billing or invoicing system) and/or provides the data to a user device. In some embodiments, multiple data points may be collected and stored for a period of time, e.g., a billing cycle, such as a month, and then used to generate an invoice or estimated charge for the particular unit corresponding to the pipe 102. In one example, a volumetric flow rate may be estimated every few seconds or every couple of minutes, stored in a table, and then used to generate an estimated water usage over the period of 30 days or other billing cycle. Then, the system 100 may apply the cost of water charged by the water utility, facility, or building/lot provider, and generate a cost due for the particular unit.

In some examples, the volume used or consumption may also be compared to a threshold, such as an average use or historical use, to determine if it exceeds the threshold, an alert may be generated, such as a leak detection alert, that may be sent to a user device.

FIG. 7B illustrates another method for utilizing the device 100 to apportion or determine individual unit water usage. This method 350 may be used with various VFR equations, such as Eq. 5, which may require less correction and/or detecting operations than other implementations. Additionally, it should be noted that various operations of FIG. 7B may be the same or substantially similar to as those described with respect to FIG. 6, with the operations of FIG. 6 being adjusted for the selected variables and parameters to be used, e.g., features of Eq. 5.

With reference to FIG. 7B, the method 350 may begin with operation 352 and installation environmental characteristics may be received. For example, the user may input characteristics regarding the installation environment, such as pipe material, pipe manufacturer, pipe diameter, and the like, into an application on a user device that transmits the environmental characteristics to server 108 or processor. As another example, the user device may capture images that are then used to determine the environmental characteristics, e.g., via image recognition techniques. For example, the user may transmit images of the environment to a server, which may then analyze the images and determine the selected environmental characteristics.

In operation 354, the server 108 may analyze the installation environmental characteristics and compare the characteristics to the database of stored data points of environmental characteristics and determined environmental correction parameters.

In operation 356, environmental correction parameters are selected. For example, the system 100 may select correction parameters that optimize the accuracy of the volume detection in light of datasets with similar environmental correction parameters. The parameters may be selected from a database of information corresponding to various installation environments.

In operation 358, the environmental correction parameters are transmitted to the device 100. For example, the device 100 may be loaded with the environmental correction parameters, e.g., as a lookup table or an equation, at a manufacturing stage, where the parameters are transmitted via a wired or wireless means. In some examples, the device 100 may be updated with the environmental correction parameters at or after install, such as by receiving the parameters from the network 106.

Operation 360 includes an optional calibration of the device 100 after installation. For example, in certain embodiments, the user may secure the device 100 to the pipe 102 and then execute a calibration method to help determine the accuracy of the device 100. As one example, the user may turn on flow through the pipe 102, e.g., turn on a faucet, and keep the faucet on until a predetermined volume has been expelled. Specifically, the user may place a container (e.g., bucket) with a predetermined volume identifier (e.g., hash marks), and run the faucet until the container is filled to a designated volume, such as 5 Gallons. Then, the device 100 can compare the detected or estimated water volume through the pipe 102 with the actual volume as captured.

In operation 362, the device 100 may be updated with supplemented environmental correction parameters that may be based on the difference between the detected volume and the actual volume. In one example, the environmental correction parameters may be updated. In another example, a new parameter, such as a calibration parameter, may be added to the volume output. In this example, the calibration parameter may be a multiplier (e.g., 0.8 or 1.2) that adjusts the device 100 detected volume in light of the difference between the detected volume and the actual volume on operation 360. It should be noted that operations 360, 362 are optional and in many instances the initial accuracy of the device 100 may be sufficient and no additional calibration operations may be needed.

Figure 8:
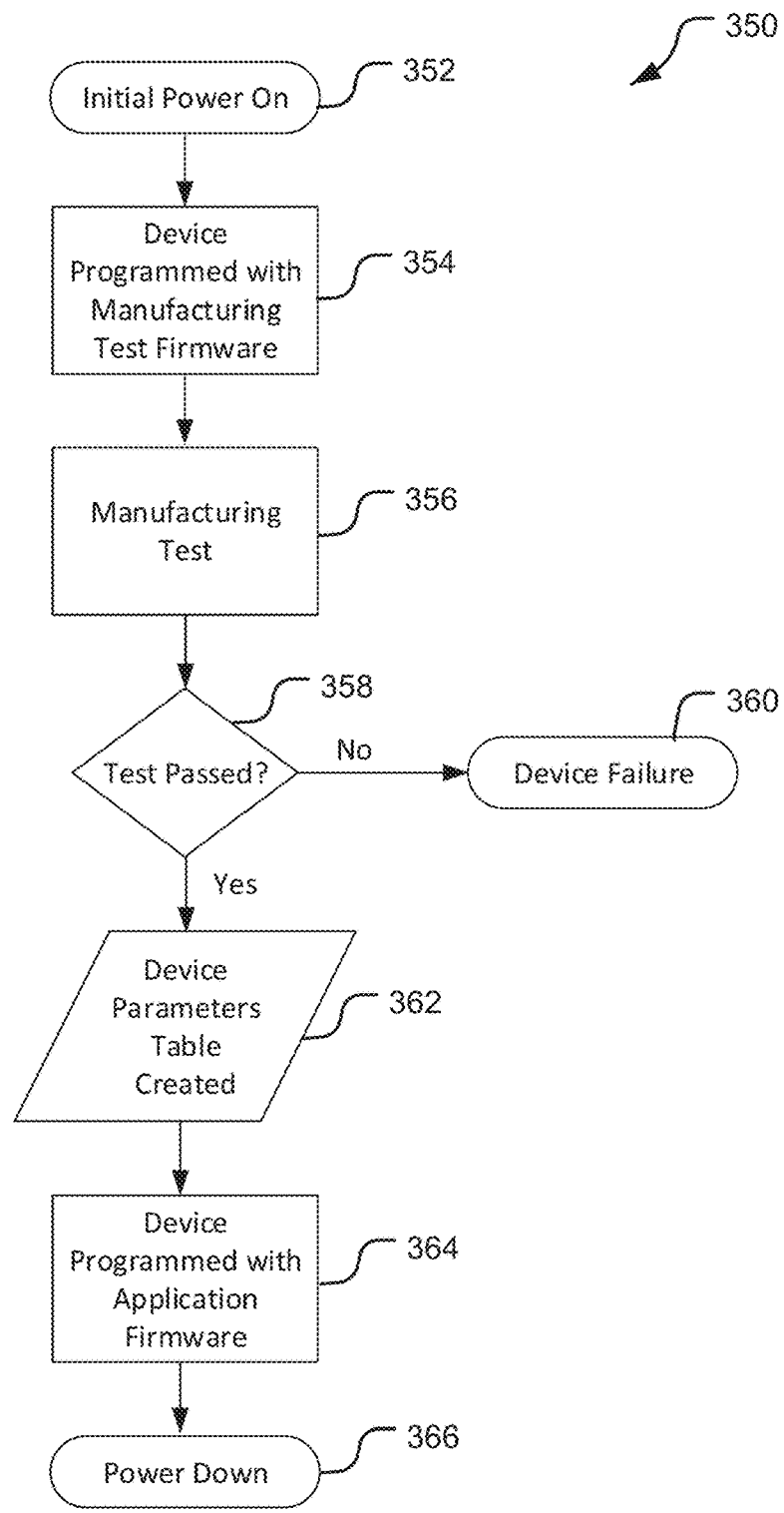
FIG. 8 shows example operations for manufacturing an example water metering device.

FIG. 8 shows example operations for manufacturing and testing the water metering device 100. The method 350 may include a power one operation 352, where the device 100 is provided with power and turned on after assembly. After an initial power on, a programming operation 354 is completed and the device 100 is programmed with manufacturing test firmware. For example, the firmware may be installed on the memory 151 of the device 100 or may be accessible to the device 100 via a connection, e.g., wired or wireless connection that couples the detection assembly 132 to a program for to allow execution of the manufacturing test 356.

Using the manufacturing test firmware, a manufacturing test operation 356 of the device 100 is conducted. This operation may include testing the detection assembly 132 and other components of the device 100 to determine that they are functioning correctly, e.g., receiving and transmitting data as appropriate. The method 350 then determines whether the device 100 has passed the test in operation 358. When the device does not pass the manufacturing test, the method 350 may proceed to a failure operation 360 where the device 100 is marked as having a defect or failure. In these instances, the device 100 may be adjusted (e.g., components replaced) and subject to a repeat manufacturing test. When the device does pass the manufacturing test, the method 350 may proceed to operation 362 and the device 100 may be programmed with application firmware. For example, the application firmware may be stored in memory 151 on the device 100 to allow the device 100 to execute various operations. When the device is programmed with application firmware, environmental parameters, such as device parameter tables, may be created for an initial configuration of the device 100. For example, the device may be programmed with a table of correction values for each type of pipe that the device may be used to monitor. Once the device parameters table is created, the device may be powered down in operation 366.

Figure 9:
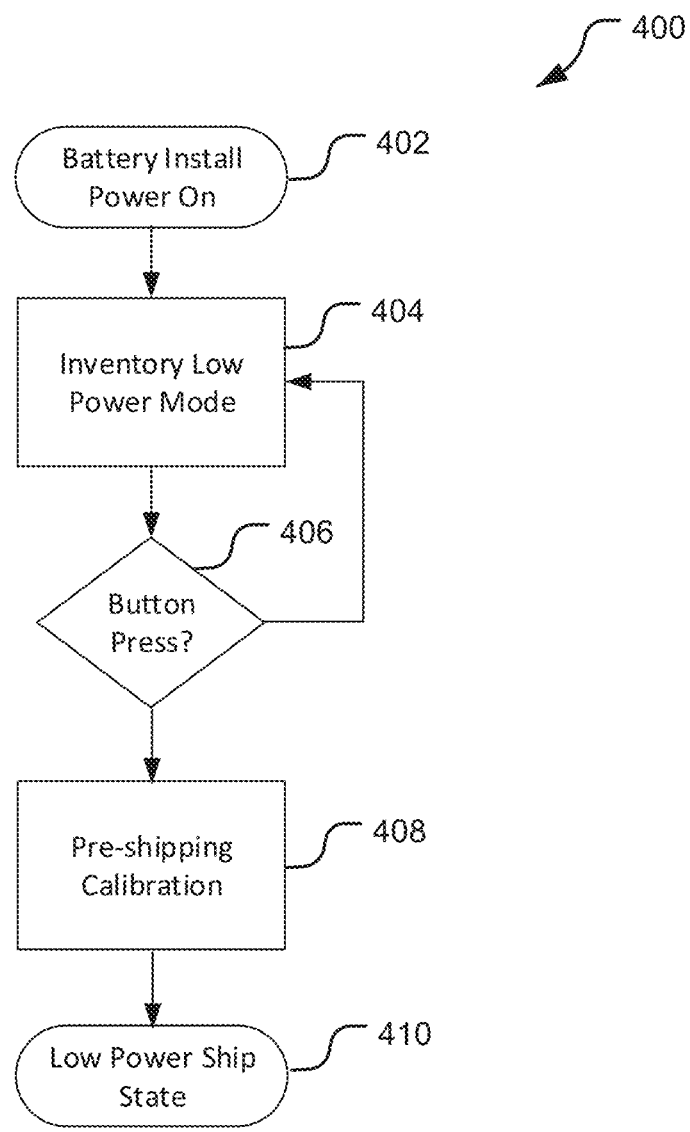
FIG. 9 shows example operations for factory setup process of an example water metering device.

FIG. 9 shows a method 400 including example operations for a setup of an example water metering device, e.g., device 100, that may be done before installation, such as after manufacturing. Operation 402 includes a power on of the device 100, this may occur after a battery install. Operation 404 includes placing the device 100 in an inventory or low power mode. The device 100 may remain in a low power mode until in operation 406 and a signal is received (e.g., a button press or switch flip) to exit low power mode and enter operation 408, the pre-shipping process. During pre-shipping process operation 408, the device environmental correction parameters or parameter table or other tables or data loaded on the device during manufacturing may be modified. In some embodiments, multiple environmental correction parameters may be preloaded to the device and the user can select a particular set at installation.

In other embodiments, the environmental correction parameters may be selected for the specific environment during operation 408. For example, pre-shipping process may fine tune the device parameter table or environmental correction parameters for accuracy for a particular type of pipe and other factors or characteristics of the eventual installation location or environment (e.g., as received from a user device). The device parameter table may be further adjusted for known values for the device destination, such as, for example, known flowrates, known ambient temperature, known water temperature, and measured pipe dimensions. After the device parameters table is modified, the method 400 may proceed to operation 410 and the device 100 a low power mode for shipping.

Figure 10:
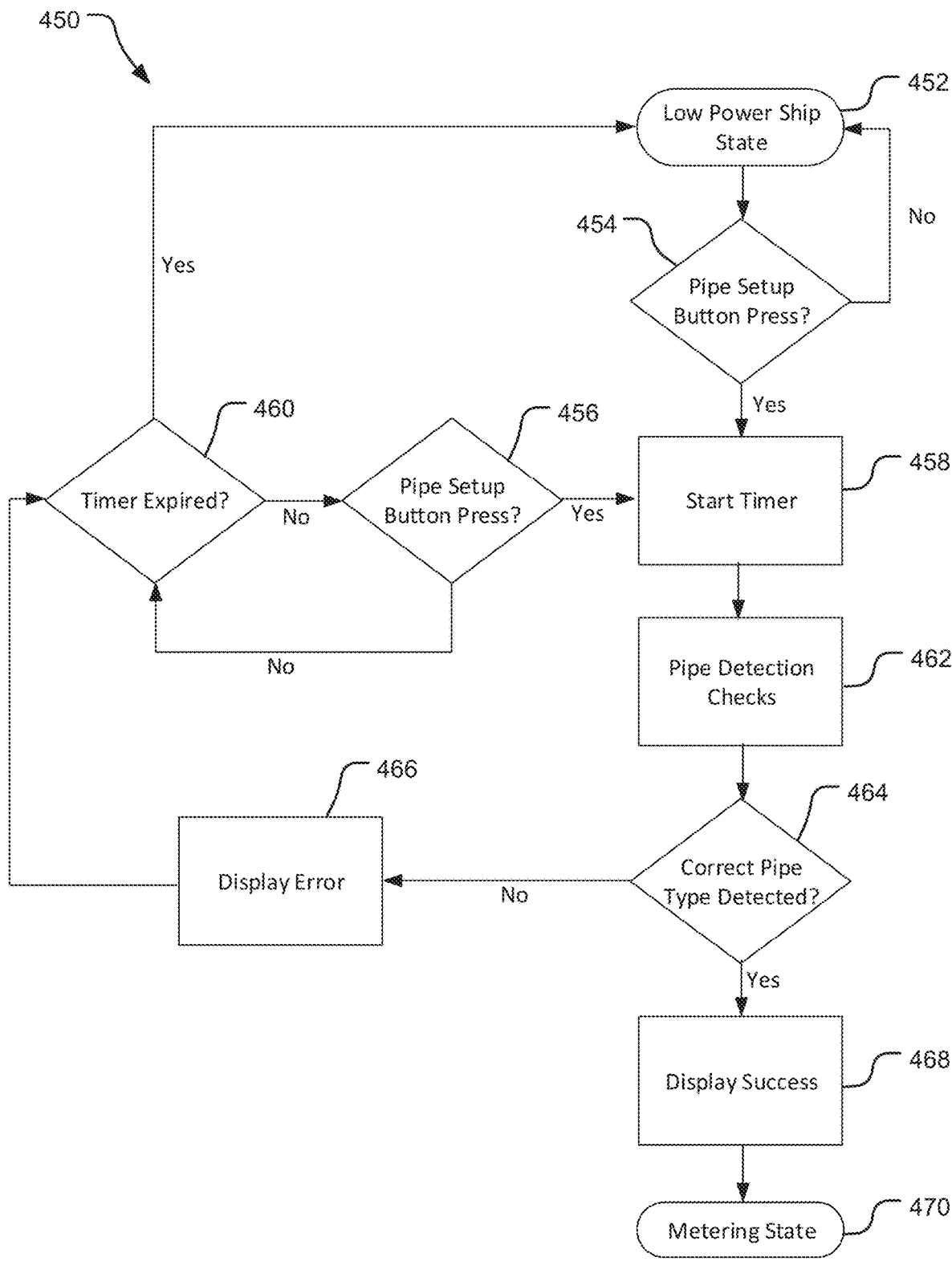
FIG. 10 shows example operations for installation of an example water metering device.

FIG. 10 shows a method 450 including example operations for installation of the device 100. In operation 452, the device 100 is initially in a reduced power or low power state for shipping. The device 100 may remain in a low power mode until receipt of a signal (e.g., a button press, switch flip, or motion detected), e.g. in operation 454 the device determines whether a signal is received, such as a wakeup signal. Upon receipt of the signal and exiting low power mode, in operation 458, a timer begins running for a specified amount of time. The timer may run for sufficient time to allow the device 100 to be physically connected to a pipe before installation and display a success or failure to the user. The timer may also prevent the device from mistakenly entering the meter state before installation (e.g., by accidental button press during shipping).

In operation 462, once the device 100 is physically installed on a pipe 102 and the pipe setup button (or other user input) is pressed or selected, the device 100 performs device setup checks. For example, the device 100 may use the ultrasonic transducers to detect whether the pipe is the diameter expected by the device 100. In some implementations, additional sensors, such as temperature sensors, may be used to detect environmental conditions and to check that the environmental conditions are the conditions the device was programmed for. When the correct or expected pipe type is detected, the method 450 may proceed to operation 408 and an optional user notification regarding the installation success may be provided to the user (e.g., display on the device 100 or via notification on the app). In operation 470, the device 100 may enter a metering mode to actively meter water or fluid flowing through the pipe. When the correct pipe type is not detected, the method 450 may proceed to operation 466 and the device 100 may display or convey an error code and the time may begin again. It should be noted that in some embodiments, after the timer has expired in operation 460 without a successful installation, the method 450 may return to operation 452 and the device 100 may be placed again in a low power state, e.g., a ship state. Additionally, if the device 100 receives a user input, such as a button press, after expiration of the time, the method 450 may proceed to operation 458 and the timer may start again.

Figure 11A:
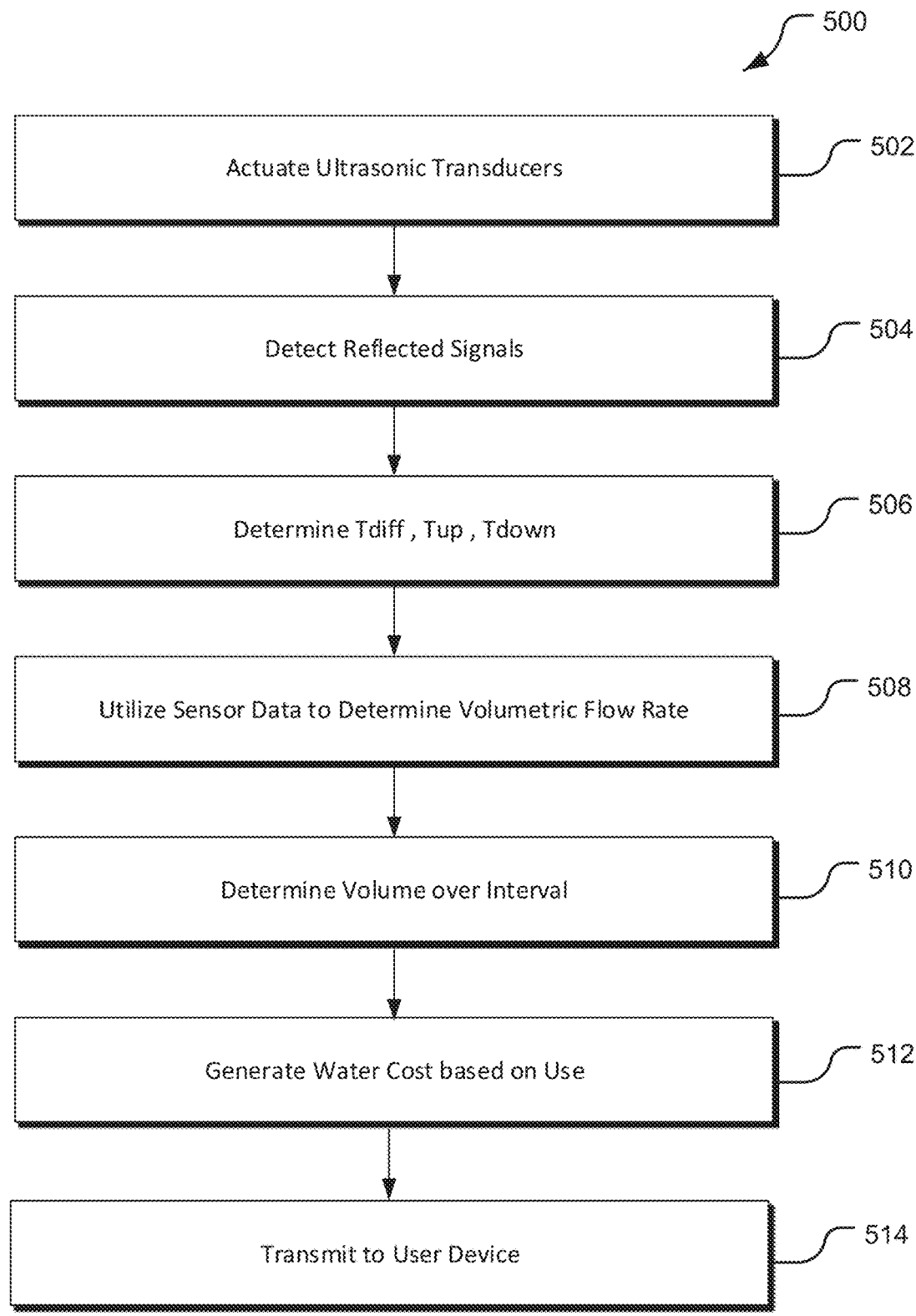
FIG. 11A illustrates a method of utilizing the system of FIG. 1.
Figure 11B:
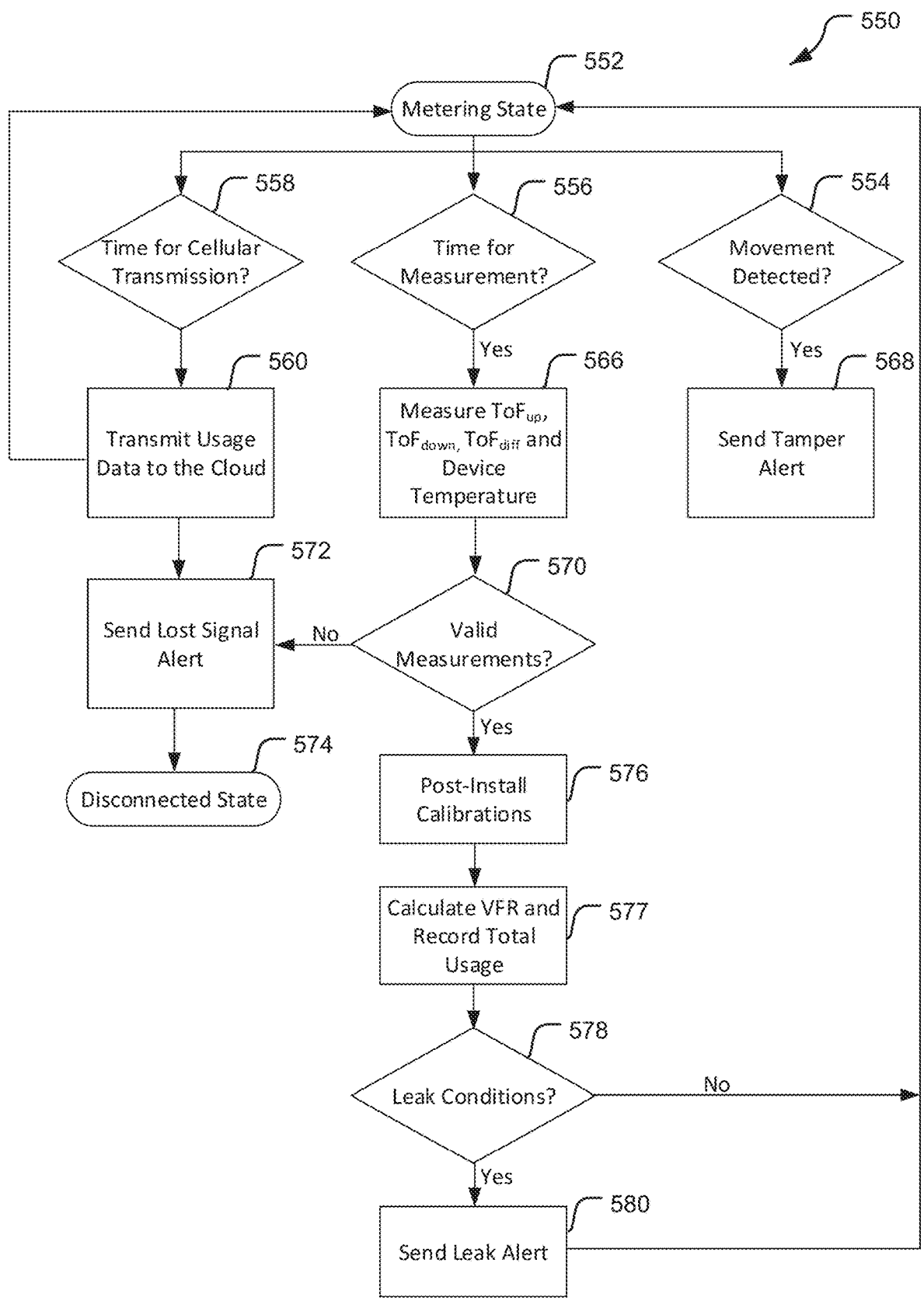
FIG. 11B illustrates another method of utilizing the system of FIG. 1 including the water metering device.

FIGS. 11A and 11B illustrate example methods and operations for water metering and water allocation or apportionment using an example water metering device, such as device 100. Once the device has been installed using, for example, the operations detailed in FIG. 10, the device enters a metering state. Generally, while in the metering state, the device 100 measures flow through a pipe.

With reference to FIG. 11A, the method 500 may begin with operation 502 and the device 100 may actuate the ultrasonic transducers 160a, 160b. In one embodiment, both ultrasonic transducers 160a, 160b may be actuated simultaneously, in other embodiments, they may be actuated at different times. At actuation, each may emit or generate an ultrasonic sound wave or chirp.

In operation 504, the device 100 receives the emitted chirps. For example, the first ultrasonic transducer 160a may receive the chirp as emitted by the second ultrasonic transducer 160b and vice versa. The chirps may be received at select times, such as $\text{ToF}_{up}$ and $\text{ToF}_{down}$.

In operation 506, select variables may be determined. For example, the processing element may utilize the detected $\text{ToF}_{up}$ and $\text{ToF}_{down}$ to determine the $\text{To}_{diff}$.

In operation 508, the sensor data and the selected variables are used to determine the volumetric flow rate (VFR). For example, equation Eq. 5 can be used to generate the determined VFR. Utilizing the volumetric flow rate, the method 500 proceeds to operation 510 and the fluid volume over the last sampled interval is determined, e.g., over the last half-second or second. For example, the volume is determined based on the VFR×the time, where it is assumed that the VFR was constant over the sampling interval. In some embodiments, the interval may include multiple sampling intervals, such as multiple minutes or hours, where the sampling interval may much shorter. In such instances, the interval volume may be determined by adding the volume total for each sampling interval captured during the detection interval to generate a total volume. For example, if a first sample is taken at a first point in time with a volume of 0.5 gallons and a second sample is taken at a second point in time with a volume of 0.6 gallons, the total volume over a detection interval including both the first and second samples is 1.1 gallons.

In operation 512, the water cost may be determined using the usage over the detection interval. In many instances, the detection interval may correspond to a billing period, e.g., 30 days or monthly. In these examples, the system 100 may retrieve a water cost, such as from a water utility or cost based on the select location and apply the cost to the detected volume.

In operation 514, the water cost may be transmitted to a user device. In some examples, the cost may be provided to a third party billing system, which may then transmit the cost as part of another invoice or bill (e.g., rent) to the user. In another example, the device 100 may transmit the cost to a manager device (e.g., landlord), who may then utilize the information to generate invoices or the like.

FIG. 11B illustrates another example of a method 550 of the metering state for the device 100. This method may be used with the method 500 or separate therefrom. The device 100 may include a timer and may be programmed to collect data or transmit collected data at pre-selected intervals. For example, while in the metering state (e.g. operation 552), the device 100 may measure time of flights based on emissions by the ultrasonic transducers and device 100 temperature (optionally) at defined intervals, e.g., sampling intervals. Additionally, while in the metering state, the device 100 may transmit collected data (e.g., by wireless or cellular transmission) (operation 558) to the network 106, hub 104, and specifically to the server 108 and/or user devices, at defined intervals, e.g., after a transmitting or collecting interval is passed, the device 100 may transmit the data collected during that interval to the cloud. In some implementations, the device 100 may include additional sensors to, for example, detect attempts to tamper with the device and may send a tamper alert when the sensors detect movement. For example in operation 554, the device 100 may determine that it has been moved (e.g., by utilizing the accelerometer or other sensors) and the method 550 proceeds to operation 568 and a tamper alert is sent to a user device, e.g., an installation user device, such as manager or landlord device.

In operation 556, the device 100 may determine that a sampling interval has been reached and may proceed to operation 566 to measure water flow. After measuring the time of flights (e.g., $\text{ToF}_{up}$ and $\text{ToF}_{down}$) and optionally device or environment temperature, the method 550 may proceed to operation 570 and the device 100 may perform a check to determine whether the measurements are valid. For example, the device 100 may determine that measurements within a certain range are valid, while measurements outside of the range indicate an operating error or disconnection of the device. For example, if the amplitude or time values of a detected signal exceeds a range or a threshold, the device 100 may determine that the measurements are not valid or otherwise incorrect.

If the device 100 determines that the measurements are not valid, the method 550 may proceed to operation 572 and the device may send an alert (e.g., to a user device) indicating that the device has lost a signal or has identified another error and may enter a disconnected or error state. After operation 572, the device 100 may optionally then disconnect in operation 574 to prevent further detection and allow the user to correct or address the issue.

If the device determines that the measurements are valid in operation 570, the method 550 may proceed to operation 576 and optionally one or more post-installation operations may be performed (e.g., real-time correction parameters may be applied).

After operation 576 or in instances where real time correction parameters are not applied, the method 550 may proceed to operation 577 and the measurements are used to calculate volumetric flow rate and total usage is recorded. Based on the volumetric flow rate and total usage, in operation 578 the device 100 may determine whether a leak condition is met, e.g., whether the determined usage and rate exceeds a threshold, outside a normal operating range, or like. For example, if flow is detected over multiple time periods, such as over a few hours or the like, then the device 100 may determine there is a leak, even if the flow at any given point does not exceed a normal usage.

In the event that a leak condition threshold is met in operation 578, the method 550 my proceed to operation 580 and a leak alert may be transmitted from the device 100 or the cloud to a user device.

Figure 12:
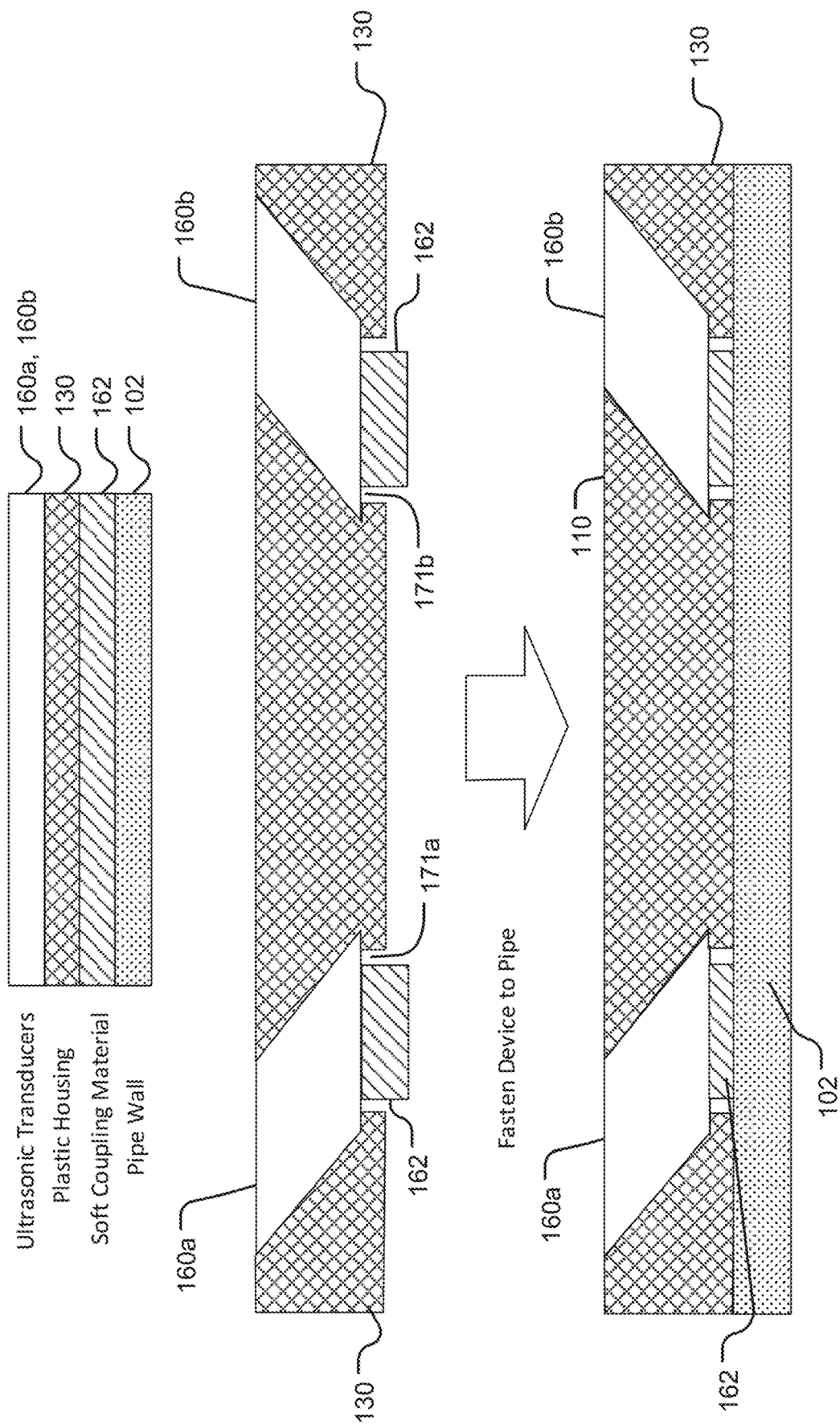
FIG. 12 shows mechanical compression of an example coupling material used in fastening an example water metering device to a pipe.

FIG. 12 shows mechanical compression of an example compressible coupling member 162 that may be used in attaching a metering device 100 to a pipe 102. The compressible coupling material helps to ensure consistency in a distance between transducers 160a, 160b and pipe 102, which typically may vary in over the pipe flow meters. The coupling member 162, which may be neoprene rubber other compressible material, preferably with a known compression value, and may be positioned between the transducer 160a, 160b and pipe 102. The device 100 may be coupled to the pipe 102 in various manners, such as fasteners, adhesive, zip ties, or the like, e.g. via fasteners 164. In some instances, the fasteners 164 may be tightened to different levels, such as when tightened by different users, which can lead to a wide range of force on the coupling material due to varied tension based on the installer strength and application of force.

The coupling member 162 may include or be formed with a compressible material with a defined or known compression distance, helps to control such variation by ensuring that the device 100 is positioned at a consistent distance relative to the pipe 102, regardless of the amount of force used to couple the device 100 to the pipe 102. For example, the device 100 housing 108 may "bottom out" on the pipe 102, such that the compressible coupling material 162 is compressed to a known thickness within the tolerances. Specifically, the mechanical system helps to ensure that even if the device 100 is secured with different force levels on different pipes 102, that the device 100 is positioned on the outer surface of the pipe 102 such that the bottom surface of the housing 130 actually touches or abuts against the outer surface of the pipe 102. This helps to ensure that the transducers 106a and 106b can be assumed to have a known distance relative to the pipe.

The transducers 160a, 160b are coupled via the coupling material 162 to be able to transmit and receive ultrasonic signals through the pipe. As noted, in many instances, the coupling member 162 may compress a fixed or otherwise predetermined amount, regardless of the tension force securing the device to the pipe. This known value allows for a known ultrasonic path length, resulting in higher accuracy. In some embodiments, the device 100 may further utilize the housing 130, e.g., plastic base, to control the distance traveled when the device is tensioned to the pipe.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, it is appreciated that numerous alterations to the disclosed embodiments without departing from the spirit or scope of the claimed invention may be possible. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A system for water usage detection comprising:
   a fluid flow meter communicatively coupled to a network and positioned completely externally to a fluid flow pipe that delivers fluid to a unit, the fluid flow meter comprising:
      a first ultrasonic transducer;
      a second ultrasonic transducer; and
      at least one coupling member that compresses by a fixed amount independent of an installation force over a threshold applied to the at least one coupling member to define a set distance between an outer surface of the fluid flow pipe and the first ultrasonic transducer and the second ultrasonic transducer;
   one or more processors communicatively coupled to at least one of the fluid flow meter and the network, wherein the processors are configured to:
      analyze an estimated fluid volume flow rate detected by the fluid flow meter to determine a fluid consumption volume for the unit over an interval;
      generate a fluid consumption cost for the unit; and
      output the fluid consumption cost to a user device via the network.

2. The system of claim 1, wherein the fluid flow meter comprises:
   a housing, wherein the first ultrasonic transducer is positioned at least partially within the housing and the second ultrasonic transducer is spaced apart from the first ultrasonic transducer and positioned at least partially within the housing; and
   the at least one coupling member comprises a first coupling member and a second coupling member, wherein the first coupling member is positioned on a bottom surface of the first ultrasonic transducer; and
   the second coupling member is positioned on a bottom surface of the second ultrasonic transducer; wherein the first coupling member and the second coupling member engage the exterior surface of the fluid flow pipe and separate the first ultrasonic transducer and the second ultrasonic transducer from the exterior surface of the fluid flow pipe.

3. A fluid meter for installation on an exterior of a fluid pipe comprising:
   a housing;
   at least one ultrasonic transducer positioned at least partially within the housing; and
   a compressible coupling member coupled to the at least one ultrasonic transducer and configured to be positioned between the at least one ultrasonic transducer and the exterior of the fluid pipe, wherein the compressible coupling member compresses a fixed amount upon application of a clamping force on the housing after a threshold force, wherein the fixed amount is the same over a variable range of clamping forces.

4. The fluid meter of claim 3, wherein the fixed amount corresponds to a distance that the compressible coupling member extends past the bottom surface of the housing in the absence of the clamping force on the housing.

5. The fluid meter of claim 3, further comprising a fastener configured to secure the housing to the exterior of the fluid pipe, wherein the fastener applies the clamping force on the housing.

6. The fluid flow meter of claim 3, wherein the at least one ultrasonic transducer comprises a first ultrasonic transducer and a second ultrasonic transducer located a first and second positions, respectively, within the housing.

7. The fluid flow meter of claim 6, further comprising a processing element in electrical communication with the at least one ultrasonic transducer, wherein the processing element is configured to: actuate the first ultrasonic transducer to emit a first chirp;
- receive a first detection time of the first chirp from the second ultrasonic transducer;
- actuate the second ultrasonic traducer to emit a second chirp;
- receive a second detection time of the second chirp from the first ultrasonic transducer;
- determine a first time of flight corresponding to the first chirp, a second time of flight corresponding to the second chirp, and a time of flight difference between the first time of flight and the second time of flight; and
- determine a volumetric flow rate in the fluid pipe based on an environmental correction parameter, the first time of flight, the second time of flight, and the time of flight difference.

8. The fluid flow meter of claim 7, wherein the environmental correction parameter is selected based on environmental characteristics of the fluid pipe.

* * * * *